(12) United States Patent
Ishinoda et al.

(10) Patent No.: US 11,249,486 B2
(45) Date of Patent: Feb. 15, 2022

(54) PARKING ASSISTANCE DEVICE

(71) Applicant: CLARION CO., LTD., Saitama (JP)

(72) Inventors: Makoto Ishinoda, Saitama (JP);
Shinya Tagawa, Saitama (JP);
Noriyasu Hasejima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 168 days.

(21) Appl. No.: 16/603,537

(22) PCT Filed: Apr. 3, 2018

(86) PCT No.: PCT/JP2018/014291
§ 371 (c)(1),
(2) Date: Oct. 7, 2019

(87) PCT Pub. No.: WO2018/186407
PCT Pub. Date: Oct. 11, 2018

(65) Prior Publication Data
US 2020/0081446 A1   Mar. 12, 2020

(30) Foreign Application Priority Data

Apr. 7, 2017   (JP) .............................. JP2017-077171

(51) Int. Cl.
G05D 1/02   (2020.01)
(52) U.S. Cl.
CPC .......... G05D 1/0225 (2013.01); G05D 1/0214 (2013.01); G05D 2201/0213 (2013.01)
(58) Field of Classification Search
CPC ............... G05D 1/0225; G05D 1/0214; G05D 2201/0213; B62D 15/0285; B62D 6/00;
(Continued)

(56) References Cited

U.S. PATENT DOCUMENTS 8,868,329 B2   10/2014   Ikeda et al.
2010/0049402 A1*   2/2010   Tanaka ...................... B60R 1/00
701/41
(Continued)

FOREIGN PATENT DOCUMENTS

CN   103079903 A   5/2013
JP   2009-184649 A   8/2009
(Continued)

OTHER PUBLICATIONS

International Search Report, PCT/JP2018/014291, dated Jun. 19, 2018, 2 pgs.
(Continued)

*Primary Examiner* — Rodney A Butler
(74) *Attorney, Agent, or Firm* — Volpe Koenig

(57) ABSTRACT

A parking assistance device assists in re-parking a vehicle that has been parked with its position and orientation deviated from ideal ones, by repositioning the vehicle to be at a correct position and in a correct orientation. A parking assistance device is adapted to assist in parking a vehicle in a parking space provided on one side of a road, and includes a parking path setting unit that sets a parking path of from the initial position of the vehicle on the road to a target parking position in the parking space, a positional deviation determination unit that determines whether there is any positional deviation between the vehicle and the parking space when the vehicle has been parked along the parking path, and a repositioning path computing unit configured to compute a repositioning path when a positional deviation is determined to be present.

6 Claims, 24 Drawing Sheets

(58) Field of Classification Search
CPC .......... B60R 99/00; G01C 21/34; G08G 1/14; G08G 1/16
See application file for complete search history.

(56) References Cited

U.S. PATENT DOCUMENTS

| | | | | |
|---|---|---|---|---|
| 2011/0082613 | A1* | 4/2011 | Oetiker | B62D 15/0285 |
| | | | | 701/25 |
| 2011/0156928 | A1* | 6/2011 | Ghisio | B62D 15/0285 |
| | | | | 340/932.2 |
| 2013/0166190 | A1 | 6/2013 | Ikeda et al. | |
| 2015/0039173 | A1 | 2/2015 | Beaurepaire et al. | |
| 2015/0100177 | A1 | 4/2015 | Inagaki | |
| 2016/0075375 | A1* | 3/2016 | Yamashita | B60K 35/00 |
| | | | | 701/41 |
| 2017/0028984 | A1 | 2/2017 | Kiyokawa et al. | |
| 2017/0032681 | A1* | 2/2017 | Tomozawa | G08G 1/168 |
| 2017/0308095 | A1* | 10/2017 | Irion | G05D 1/0282 |

FOREIGN PATENT DOCUMENTS

| | | |
|---|---|---|
| JP | 2010-208392 A | 9/2010 |
| JP | 2012-223608 A | 11/2012 |
| JP | 2014-189097 A | 10/2014 |
| JP | 2014-227021 A | 12/2014 |
| JP | 2016-084029 A | 5/2016 |
| JP | 2017-030567 A | 2/2017 |

OTHER PUBLICATIONS

Japanese Office Action dated May 19, 2020 for the Japanese Patent Application No. 2017-077171.
Extended European Search Report dated Nov. 23, 2020 for European Patent Application No. 18780697.1.
Chinese Office Action dated May 28, 2021 for Chinese Patent Application No. 201880023789.9.

* cited by examiner

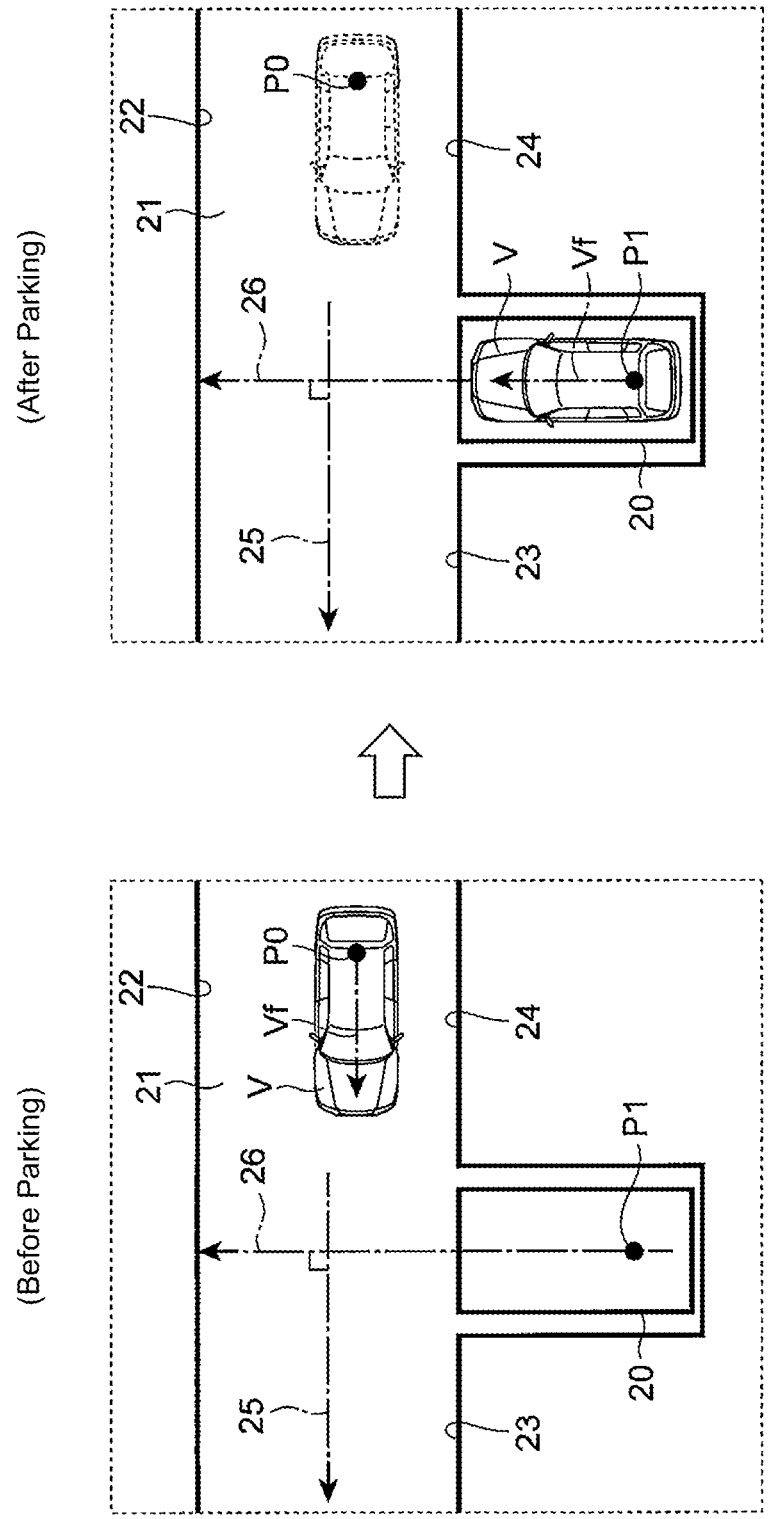

PARKING ASSISTANCE DEVICE

TECHNICAL FIELD

The present invention relates to a parking assistance device for a vehicle.

BACKGROUND ART

Patent Literature 1 discloses a technique of a parking assistance device that assists in parking a vehicle by computing a guidance path, which includes turns of the vehicle for parking the vehicle, so that the vehicle can reach a target position along the guidance path.

CITATION LIST

Patent Literature

Patent Literature 1: JP 2010-208392 A

SUMMARY OF INVENTION

Technical Problem

However, when the vehicle is actually parked along the guidance path, there is a possibility that the position and orientation of the vehicle may deviate from ideal ones due to various factors, such as the accuracy or errors of a sensor and delays in turning the steering wheel during the parking operation.

The present invention has been made in view of the foregoing. It is an object of the present invention to provide a parking assistance device for assisting in reparking a vehicle that has been parked with its position and orientation deviated from ideal ones, by repositioning the vehicle such that the vehicle is at a correct position and in a correct orientation.

Solution to Problem

The parking assistance device of the present invention that solves the aforementioned problem is a parking assistance device for assisting in parking a vehicle in a parking space that is provided on one side of a road, including a parking path setting unit configured to set a parking path of from an initial position of the vehicle on the road to a target parking position in the parking space; a positional deviation determination unit configured to, when the vehicle has been parked along the parking path, determine whether there is a positional deviation between the vehicle and the parking space; and a repositioning path computing unit configured to, when a positional deviation is determined to be present, compute a repositioning path for correcting the positional deviation by moving the vehicle from the parking space to the road and then from the road to the target parking position in the parking space.

Advantageous Effects of Invention

According to the present invention, it is possible to assist in reparking a vehicle that has been parked with its position and orientation deviated from ideal ones by repositioning the vehicle such that the vehicle is at a correct position and in a correct orientation. Further features related to the present invention will become apparent from the description of the specification and the accompanying drawings. In addition, other problems, configurations, and advantageous effects will become apparent from the following description of embodiments.

BRIEF DESCRIPTION OF DRAWINGS

FIG. 2A illustrate the state of back-in perpendicular parking, specifically, the state of a vehicle before and after the parking.

DESCRIPTION OF EMBODIMENTS

Next, embodiments of the present invention will be described with reference to the drawings.

Figure 1:
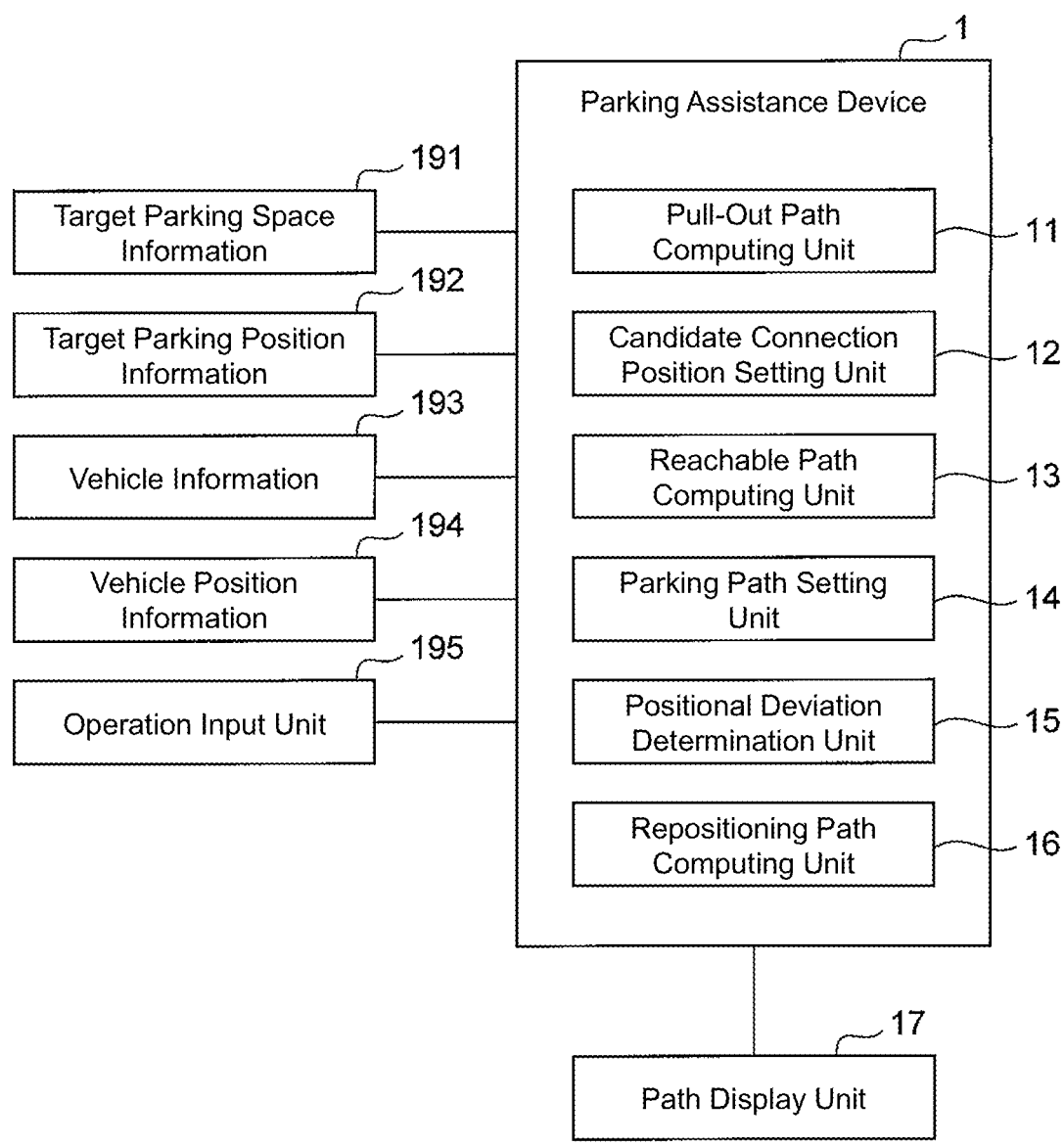
FIG. 1 is a functional block diagram of a parking assistance device according to an embodiment of the present invention.
Figure 2B:
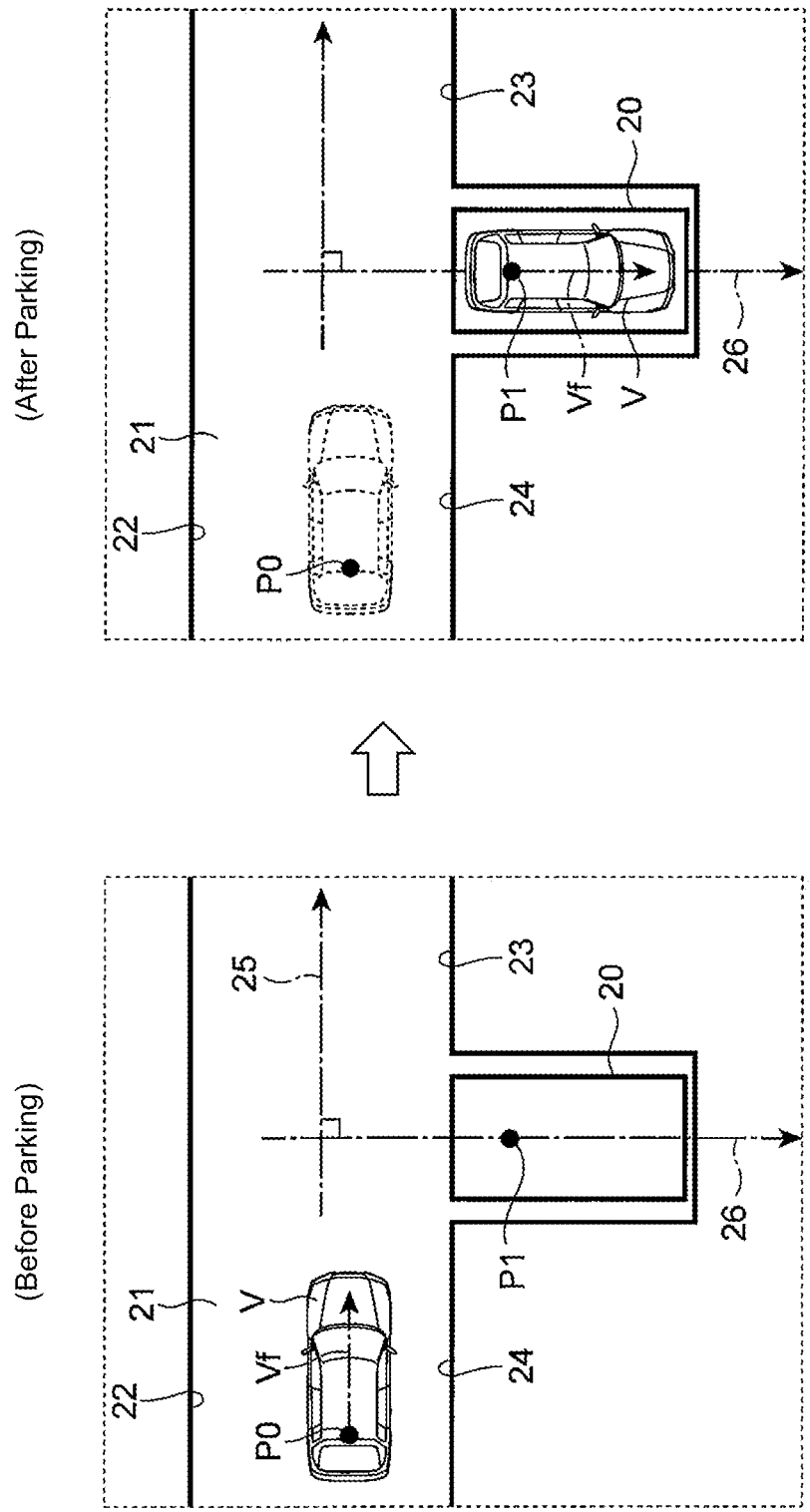
FIG. 2B illustrate the state of front-in perpendicular parking, specifically, the state of a vehicle before and after the parking.

FIG. 1 is a functional block diagram of a parking assistance device according to an embodiment of the present invention. FIG. 2A illustrate the state of back-in perpendicular parking, specifically, the state of a vehicle before and after the parking. FIG. 2B illustrate the state of front-in perpendicular parking, specifically, the state of a vehicle before and after the parking.

The parking assistance device 1 is a device for assisting in parking a vehicle V in a parking space 20, and in particular, a device for assisting in so-called perpendicular parking so that the vehicle V is parked in the parking space 20 with a parking orientation 26 arranged at right angles to the road orientation 25 of a road 21. The parking space 20 is a zoned area with a parking orientation set therein in advance to allow a vehicle to be parked in a predetermined orientation. The parking space 20 is also referred to as a parking frame, parking slot, parking area, paring place, or parking lot, for example.

In the example illustrated in FIG. 2A, the parking space 20 is provided on the left side with respect to the road orientation 25 of the road 21, and the parking orientation 26 is set to allow the vehicle V to be reverse parked in the parking space 20. In the example illustrated in FIG. 2B, the parking space 20 is provided on the right side with respect to the road orientation 25 of the road 21, and the parking orientation 26 is set to allow the vehicle V to be front-in parked in the parking space 20.

As illustrated in FIGS. 2A and 2B, the parking assistance device 1 computes a path for guiding the vehicle V so that the vehicle V is arranged with the vehicle orientation Vf directed in the same orientation as the parking orientation 26 at the target parking position P1 in the parking space 20 from the state in which the vehicle V is at the initial position P0 on the road 21 with the vehicle orientation Vf directed in the same orientation as the road orientation 25, and sets the computed path as a parking path.

Then, when an operation of parking the vehicle V is performed along the set parking path, whether there is any positional deviation between the vehicle V and the parking space is determined. If a positional deviation is determined to be present, a path for correcting the positional deviation is computed and is set as a repositioning path.

In addition, obstacles 23 and 24, such as other vehicles or other parking spaces, are arranged ahead of or behind the parking space 20 along the road 21, and also, an obstacle 22, such as a wall or a curb extending along the road orientation 25 of the road 21 or another vehicle, is arranged across the road 21 opposite to the parking space 20.

In the present example, whether the vehicle V is at the initial position P0, the target parking position P1, an intermediate target position P2 described below, a first point of tangency 31 described below, a second point of tangency 32 described below, or the like is determined with reference to a reference point Vo that is an intermediate position between the right and left rear wheels of the vehicle V. In addition, the vehicle is turned along a clothoid curve, for example.

The parking assistance device 1 computes a parking path for guiding the vehicle V into the parking space 20. Therefore, moving the vehicle V along the computed parking path can park the vehicle V in the parking space 20 on the side of the road. In addition, if the vehicle V is parked with its position and orientation deviated from ideal ones as a result of having been moved along the parking path, a repositioning path for correcting the positional deviation is computed. Therefore, moving the vehicle V along the computed repositioning path can correct the positional deviation and park the vehicle V at a correct position and in a correct orientation in the parking space 20.

The vehicle V may be moved by being operated by the driver while he/she is watching an in-vehicle monitor that displays the parking path, for example. Alternatively, a system may be configured such that information on the parking path is output from the parking assistance device 1 and the vehicle V is parked at the target parking position P1 either automatically or semi-automatically. Similarly, the in-vehicle monitor may display a repositioning path so that the driver may operate the vehicle V while watching the repositioning path displayed on the in-vehicle monitor. Alternatively, a system may be configured such that information on the repositioning path is output from the parking assistance device 1 and the vehicle V is parked at the target parking position P1 either automatically or semi-automatically. When the vehicle V is parked semi-automatically, steering wheel operations are controlled automatically, while accelerator and brake operations are conducted by the driver, for example. Meanwhile, when the vehicle V is parked automatically, all of the steering wheel operations and accelerator and brake operations are controlled automatically.

The parking assistance device 1 is mounted on the vehicle V, and is implemented through cooperative operations of hardware, such as a microcomputer, and a software program. The parking assistance device 1 includes, as illustrated in FIG. 1, a pull-out path computing unit 11, a candidate connection position setting unit 12, a reachable path computing unit 13, a parking path setting unit 14, a positional deviation determination unit 15, and a repositioning path computing unit 16.

The pull-out path computing unit 11 computes at least one pull-out path for pulling the vehicle V out of a target parking space 20 on the basis of information on the target parking space and constraint conditions regarding vehicle behavior. The candidate connection position setting unit 12 sets a plurality of candidate connection positions on each pull-out path. The reachable path computing unit 13 computes a reachable path that allows the vehicle V to reach each candidate connection position from the initial position P0 as the current position of the vehicle V. The parking path setting unit 14 sets a parking path for the vehicle V by connecting the pull-out path and the reachable path and, if there is a plurality of parking paths, selects an optimal parking path from among them on the basis of predetermined conditions.

The parking assistance device 1 receives, as illustrated in FIG. 1, target parking space information 191, target parking position information 192, vehicle information 193, and vehicle position information 194. The target parking space information 191 includes information on constraint conditions regarding a parking space, such as the positions of and distances to obstacles around the parking space 20.

The target parking position information 192 includes information, such as the shape of the parking space 20 and the relative position of the parking space 20 with respect to the vehicle V. The vehicle information 193 includes information on constraint conditions regarding vehicle behavior, such as a turning radius of the vehicle V. For the vehicle position information 194, dead reckoning positions computed with a vehicle model on the basis of the steering angle and speed of the vehicle V as well as the number of revolutions of the wheels may be used, and also, positional information obtained with a sensor, such as a GPS, or vehicle position information obtained through road-vehicle communication or inter-vehicle communication may be used.

The operation input unit 195 inputs to the parking assistance device 1 information on a parking space selected by a user, for example. A path display unit 17 is an in-vehicle monitor that the driver can watch in the vehicle, and can display the position of a turn of the vehicle regarding a target parking path in a manner overlapped with a video from a camera. The path display unit 17 may display not only the position of a turn of the vehicle but also the entire parking path. Then, the driver is able to watch and check the position of a turn of the vehicle as well as a parking path displayed on the in-vehicle monitor.

<Pull-Out Path Computing Unit>

The pull-out path computing unit 11 computes a pull-out path on the basis of the target parking space information 191, the target parking position information 192, and the vehicle information 193. The target parking space information 191 can be obtained from a detected signal of an ultrasonic sensor mounted on the vehicle V or an image from an in-vehicle camera, for example. In addition, infrastructure information output from a parking facility may be obtained.

The pull-out path is a virtual movement path obtained by estimating a path along which the vehicle V is pulled out of the parking space 20 from the state in which the vehicle V is correctly arranged in the parking space 20. The pull-out path is computed totally independently of and without relevance to the initial position P0 of the vehicle V. The pull-out path computing unit 11 does not use the vehicle position information 194 when computing the pull-out path. More than one pull-out path may be computed, and at least one pull-out path is computed.

The pull-out path is computed on the basis of information on the target parking space and the constraint conditions regarding vehicle behavior. For example, when back-in perpendicular parking is assisted, provided that the target parking position P1 is the origin, a path, which is based on the premise that the vehicle V will be pulled out of the parking space in the same direction as the orientation of the vehicle V at the initial position P0, is created, while when front-in perpendicular parking is assisted, provided that the target parking position P1 is the origin, a path, which is based on the premise that the vehicle V will be pulled out of the parking space in the direction opposite to the orientation of the vehicle V at the initial position P0, is created.

For example, when back-in perpendicular parking is assisted so that the vehicle V is reverse parked at the target parking position P1, the following paths are computed: a path for moving the vehicle V straight forward from the target parking position P1 until the reference point Vo that is an intermediate position between the right and left rear wheels of the vehicle V (hereinafter referred to as a "position Vo" of the vehicle) reaches a position outside of the parking space 20; a forward drive path for moving the vehicle V forward while turning it in the same direction as the orientation of the vehicle V at the initial position P0 so as to leave the parking space until the vehicle V reaches a reachable limit position with respect to an obstacle ahead; and a reverse drive path for backing up the vehicle V with its front wheels adjusted straight again with respect to the vehicle V until the vehicle V reaches a reachable limit position with respect to an obstacle behind. The forward drive path and the reverse drive path are alternately computed to compute a pull-out path until a predetermined termination condition is satisfied. It should be noted that the "reachable limit position" means a position at which the vehicle V is away from an obstacle with a predetermined gap therebetween. The predetermined gap includes a predetermined error taken into consideration as a margin so that the vehicle V will not contact the obstacle. The predetermined gap is preferably as small as possible, and is set to about 1 to 5 cm, for example. In the present embodiment, a virtual frame with a predetermined gap is set in a region around the outer periphery of the vehicle V, and a position at which the virtual frame contacts the obstacle is determined as a reachable limit position.

Meanwhile, when front-in perpendicular parking is assisted so that the vehicle V is front-in parked at the target parking position P1, the following paths are computed: a path for backing up the vehicle V straight from the target parking position P1 until the position Vo of the vehicle V reaches a point that is away from the parking space 20 by a predetermined distance; a reverse drive path for backing up the vehicle V while turning it in a direction opposite to the orientation of the vehicle V at the initial position P0 so as to leave the parking space until the vehicle V reaches a reachable limit position with respect to an obstacle behind; and a forward drive path for moving the vehicle V forward while turning it in the same direction as the orientation of the vehicle V at the initial position P0 so as to leave the parking space until the vehicle V reaches a reachable limit position with respect to an obstacle ahead. The forward drive path and the reverse drive path are alternately computed to compute a pull-out path until a predetermined termination condition is satisfied.

The pull-out path computing unit 11 computes a pull-out path until at least one of the following conditions is satisfied as the predetermined termination condition, for example: a first condition in which the orientation of the vehicle V on the pull-out path is at an angle greater than or equal to 90° with respect to the parking orientation 26, a second condition in which the vehicle V has reached a point that is away from the target parking position P1 by a predetermined distance Hmax along the road orientation 25, or a third condition in which the number of turns of the vehicle on the pull-out path has reached a predetermined number.

Figure 3:
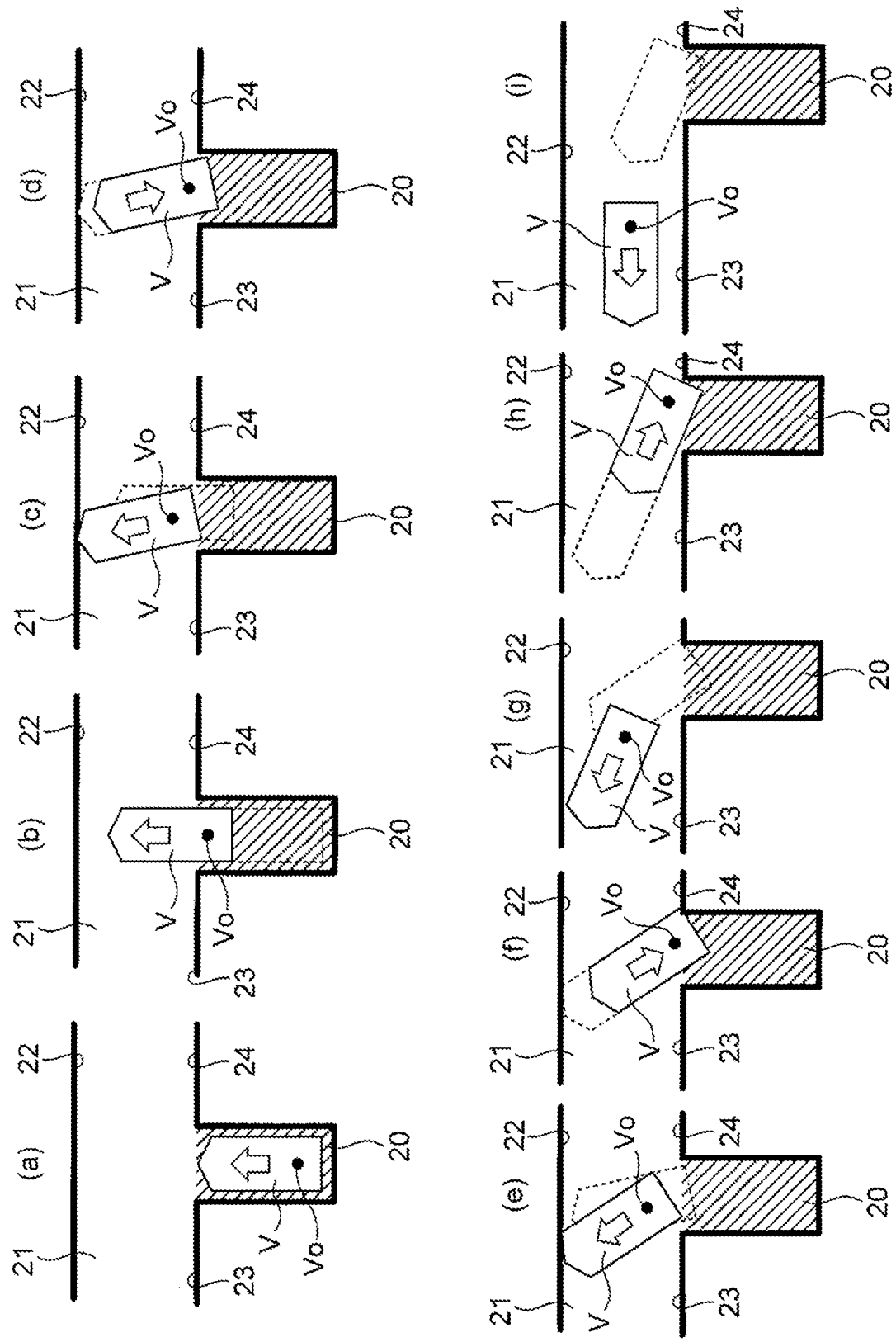
FIG. 3 illustrate an exemplary method of computing a pull-out path for back-in perpendicular parking.
Figure 4:
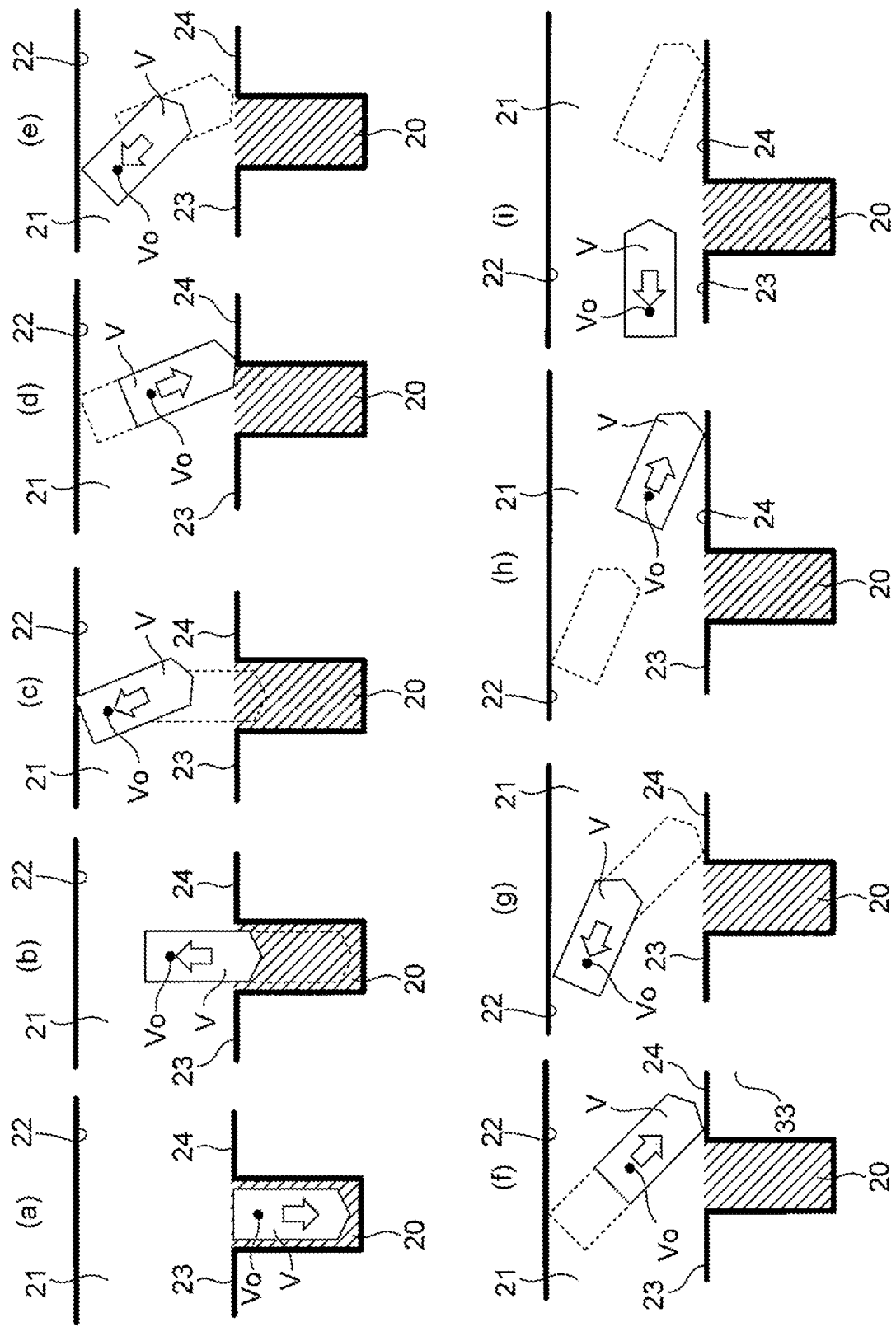
FIG. 4 illustrate an exemplary method of computing a pull-out path for front-in perpendicular parking.

FIGS. 3 and 4 each illustrate an exemplary method of computing a pull-out path for a vehicle according to preset conditions. Specifically, FIG. 3 illustrate a case for back-in perpendicular parking, and FIG. 4 illustrate a case for front-in perpendicular parking.

The pull-out path is computed as follows for back-in perpendicular parking exemplarily illustrated in FIG. 3, for example: (a) the vehicle V is moved straight forward from the state in which the vehicle V is parked in the parking space 20, (b) the position Vo of the vehicle V reaches a position outside of the parking space 20, (c) the vehicle V is moved forward while being turned to the left until the vehicle V reaches a reachable limit position with respect to the obstacle 22 ahead, (d) the vehicle V is backed up from that position with its front wheels adjusted straight again along the vehicle orientation of the vehicle V until the vehicle V reaches a reachable limit position with respect to the obstacle 24 behind, and then, the vehicle V is moved along (e) a forward drive path for moving the vehicle V forward while turning it to the left, (f) a reverse drive path for backing up the vehicle V straight, (g) a forward drive path for moving the vehicle V forward while turning it to the left, and (h) a reverse drive path for backing up the vehicle V straight so that (i) the vehicle orientation of the vehicle V has an angle of 90° with respect to the parking orientation of the parking space 20.

Similarly, the pull-out path is computed as follows for front-in perpendicular parking exemplarily illustrated in FIG. 4, for example: (a) the vehicle V is backed up straight from the parking space 20 from the state in which the vehicle V is parked at the target parking position P1, (b) the position Vo of the vehicle V reaches a point that is away from the parking space 20 by a predetermined distance, (c) the vehicle V is backed up while being turned to the right until the vehicle V reaches a reachable limit position with respect to the obstacle 22 behind, (d) the vehicle V is moved forward from that position while being turned to the left until the vehicle V reaches a reachable limit position with respect to the obstacle 24 ahead, and then, the vehicle V is moved along (e) a reverse drive path for backing up the vehicle V while turning it to the right, (f) a forward drive path for moving the vehicle V forward while turning it to the left, (g) a reverse drive path for backing up the vehicle V while turning it to the right, and (h) a forward drive path for moving the vehicle V forward while turning it to the left so that (i) the vehicle orientation of the vehicle V has an angle of 90° with respect to the parking orientation of the parking space 20.

It should be noted that the method of computing the pull-out path is not limited to the one described above, and computation may be performed using other conditions. Alternatively, computation may be performed using a condition suitable for a target parking space that has been selected from among a plurality of preset conditions.

<Candidate Connection Position Setting Unit>

The candidate connection position setting unit 12 sets a plurality of candidate connection positions on the pull-out path. A candidate connection position is a candidate position for determining whether the initial position P0 can be connected to the pull-out path via a reachable path. As one of methods of setting candidate connection positions, for example, the candidate connection position setting unit 12 sets a plurality of candidate connection lines PL at predetermined intervals on the road 21 along the road orientation of the road 21, and sets the positions of intersection between the position Vo of the vehicle V and the candidate connection lines PL on the pull-out path as candidate connection positions D, and then stores the candidate connection positions D in association with the vehicle orientations Vf of the vehicle V at those positions.

Figure 5:
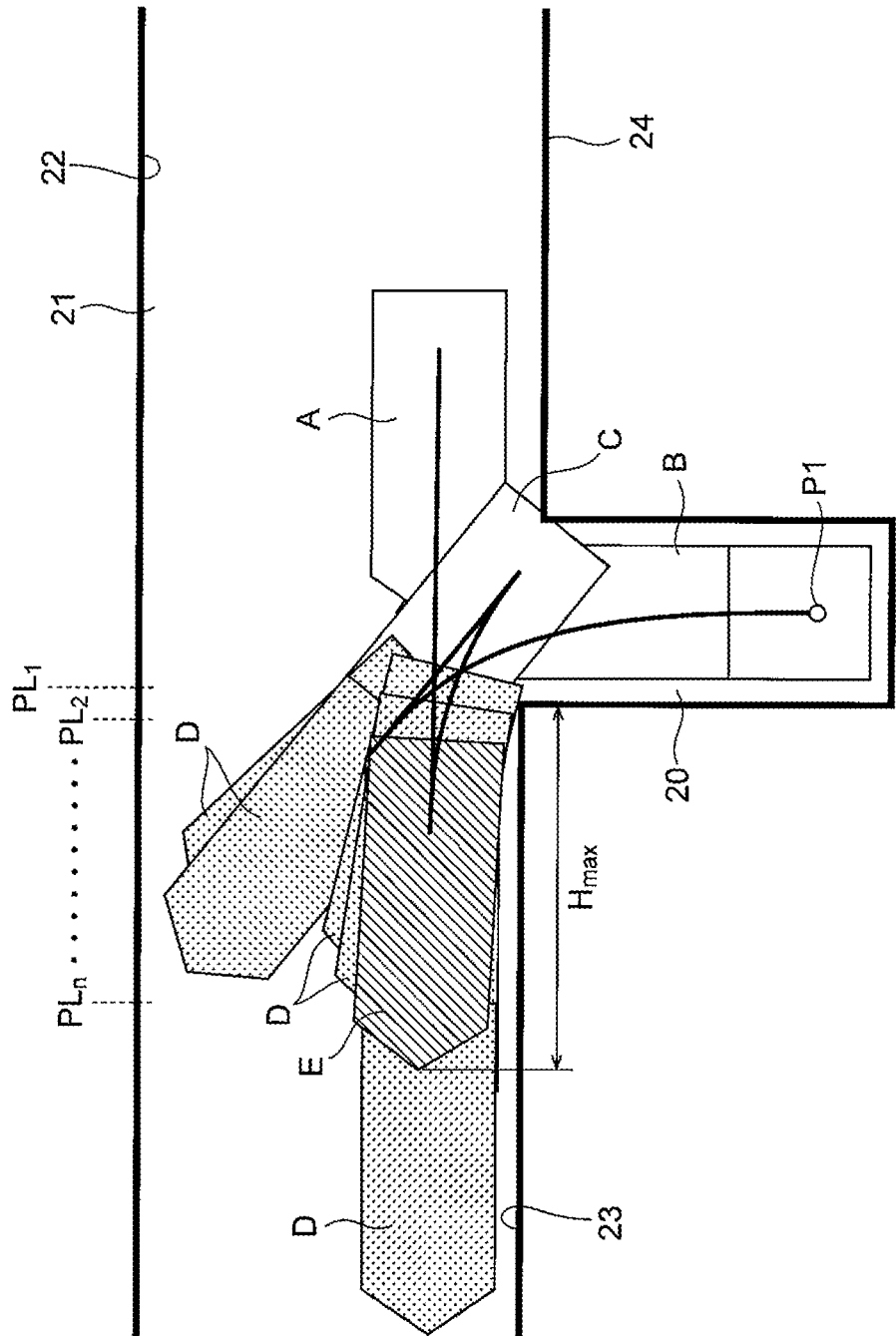
FIG. 5 illustrates candidate connection positions on a pull-out path for back-in perpendicular parking.

FIG. 5 illustrates candidate connection positions on an inverse path for back-in perpendicular parking. The candidate connection lines PLn (n is a number) are set such that they extend in the width direction of the road 21 at positions ahead of the target parking position B, along the road orientation of the road 21. Specifically, the candidate connection lines PLn are set at predetermined intervals on the road 21 in the leftward direction from the parking space 20, for example, at intervals of 0.5 to 1.5 m along the lateral direction with reference to the target parking position B in the present embodiment. In addition, positions at which the position Vo of the vehicle V passes the candidate connection lines PL on the pull-out path are set as the candidate connection positions D, and the vehicle orientations Vf of the vehicle V at those positions are stored. It should be noted that in the drawing, symbol A denotes the initial position, reference symbol B denotes the target parking position, symbol C denotes the reachable limit position, and symbol E denotes a park-out position.

Figure 6:
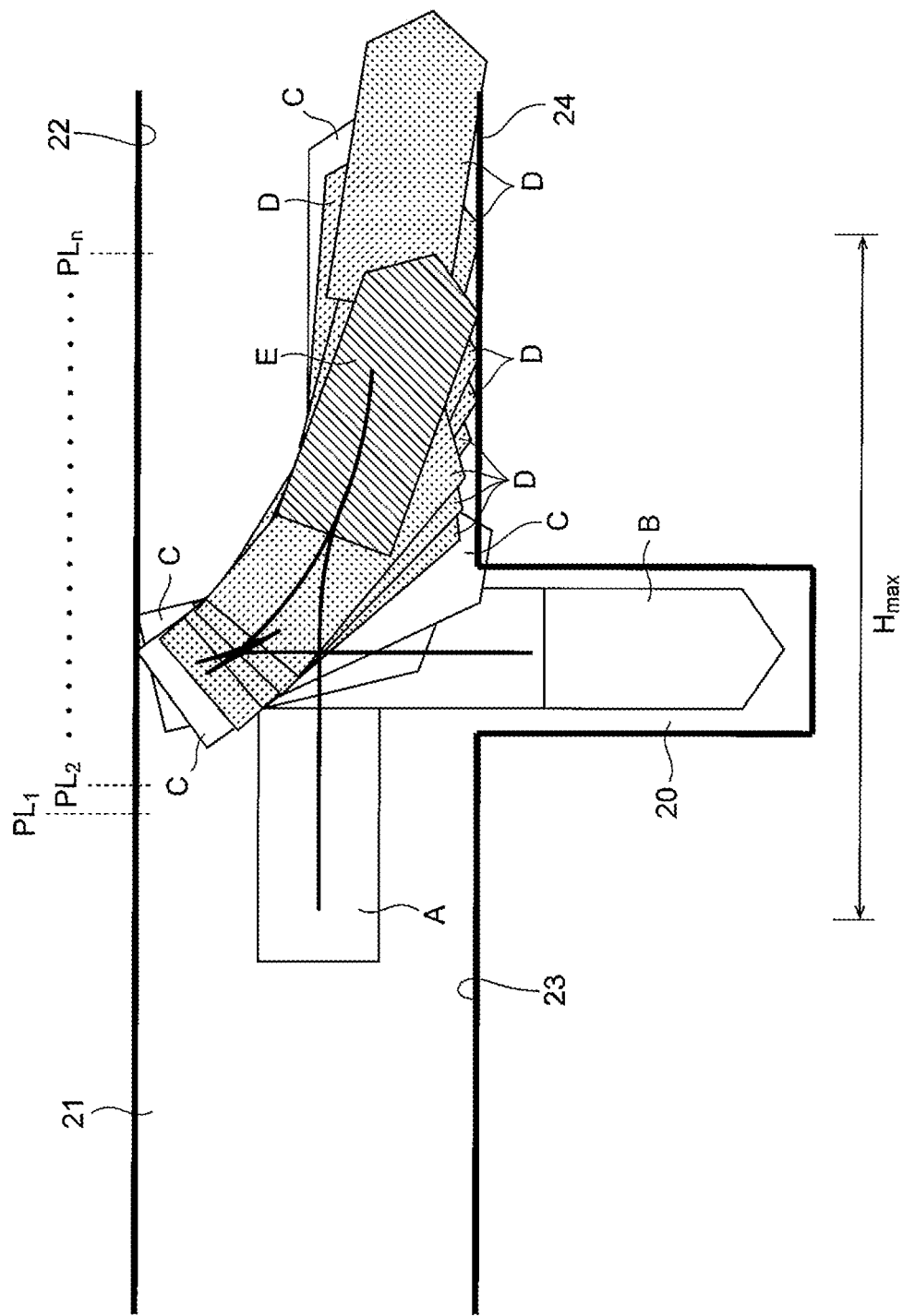
FIG. 6 illustrates candidate connection positions on a pull-out path for front-in perpendicular parking.

FIG. 6 illustrates candidate connection positions on a pull-out path for front-in perpendicular parking.

The candidate connection lines PL are set such that they extend in the width direction of the road 21 at positions ahead of the target parking position B, along the road orientation of the road 21, for example, at intervals of 0.5 m along the road orientation of the road 21 in the present embodiment. In addition, positions at which the position Vo of the vehicle V passes the candidate connection lines PL on the pull-out path are set as the candidate connection positions D, and the vehicle orientations Vf of the vehicle V at those positions are stored.

Figure 7:
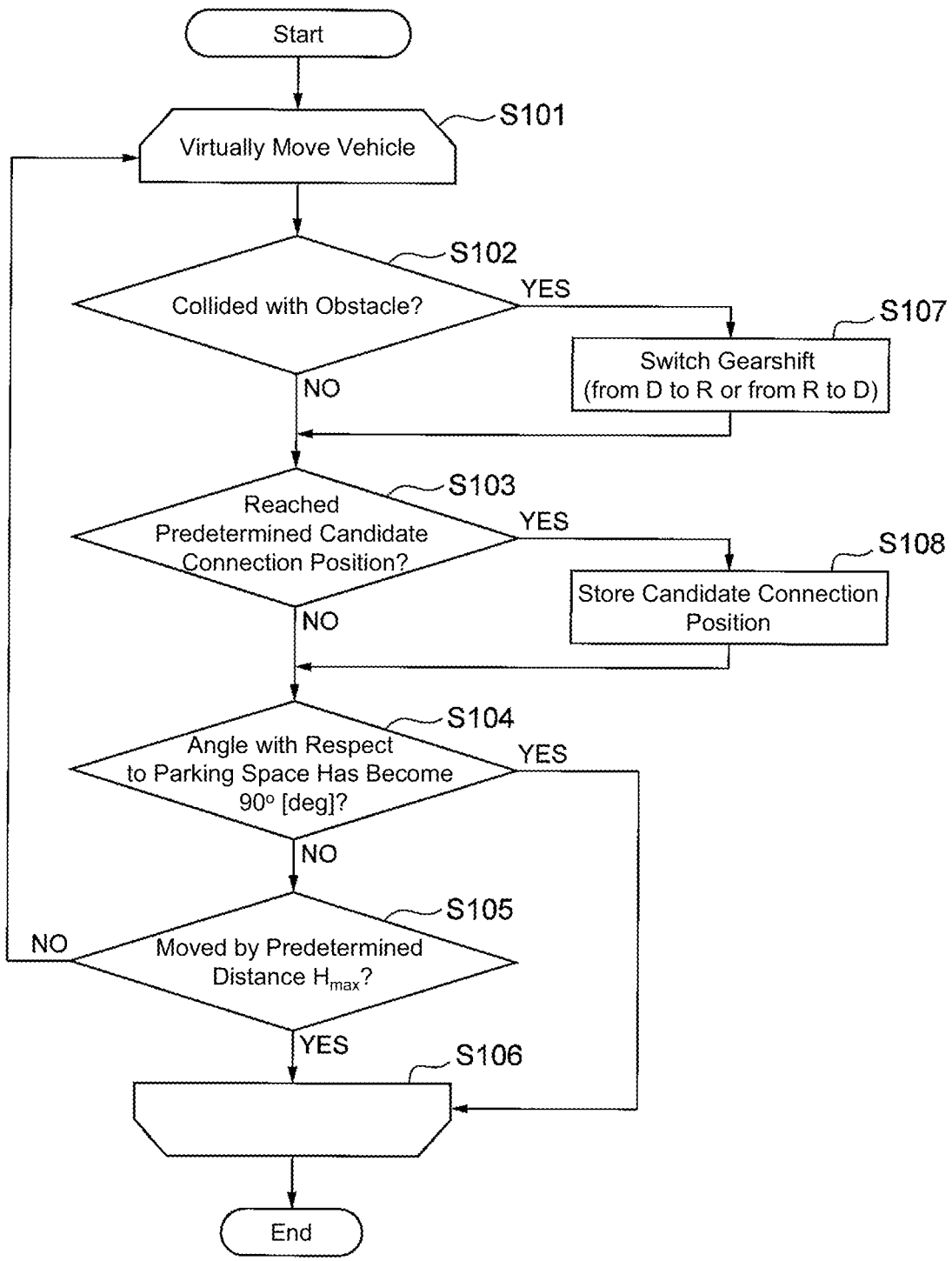
FIG. 7 is a flowchart illustrating a method of computing candidate connection positions on a pull-out path.

FIG. 7 is a flowchart illustrating a method of computing candidate connection positions on the pull-out path. First, computation for virtually moving the vehicle V in the direction to leave the target parking position P1 is performed according to a predetermined rule (S101), and whether a virtual frame of the vehicle V has collided with an obstacle is determined (S102). If the virtual frame of the vehicle V is determined to have collided with an obstacle, such position is determined as the reachable limit position C, and the gearshift of the vehicle V is switched from the D (drive) range to the R (reverse) range or from the R range to the D range so that the traveling direction of the vehicle V is switched back from forward drive to reverse drive or from reverse drive to forward drive (S107).

Then, whether the vehicle V has reached a predetermined candidate connection position D is determined (S103), and when the position Vo of the vehicle V has passed a candidate connection line PL, such position is set as the candidate connection position D, and the vehicle orientation Vf of the vehicle V at that position is stored (S108). Then, whether the vehicle V is at an angle of 90° [deg] with respect to the parking orientation 26 (i.e., whether the first condition is satisfied) is determined (S104), and if the vehicle V is determined to be at an angle of 90° [deg] with respect to the parking orientation 26, the first condition is determined to be satisfied, and thus, the present routine terminates.

Meanwhile, if the vehicle orientation Vf of the vehicle V is not determined to be at an angle of 90° [deg] with respect to the parking orientation 26, whether the vehicle V has moved away from the parking space by a distance greater than or equal to a predetermined distance Hmax is determined (S105). In the present embodiment, the predetermined distance Hmax is set to 7 meters. If the vehicle V is determined to have moved by a distance greater than or equal to the predetermined distance Hmax, the second condition is determined to be satisfied, and thus, the present routine terminates.

As another method of setting candidate connection positions, the candidate connection position setting unit 12 may, each time the orientation of the vehicle V has changed by a predetermined relative angle (for example, every 5° [deg]) when the vehicle V is moved in the direction to leave the parking space along the pull-out path, set such position as a candidate connection position.

<Reachable Path Computing Unit>

The reachable path computing unit 13 computes a reachable path that allows the vehicle V to reach at least one of the plurality of candidate connection positions D from the initial position P0 of the vehicle V. A "reachable path" is a path that allows the vehicle V to reach a candidate connection position D from the initial position P0 of the vehicle V through one of forward drive or reverse drive of the vehicle V, without switching between forward drive or reverse drive. Whether the vehicle V can reach the candidate connection position Pn is determined on the basis of the position Vo and vehicle orientation Vf of the vehicle V. If the position Vo of the vehicle V coincides with the candidate connection position D and the vehicle orientation Vf of the vehicle V coincides with the vehicle orientation Vf of the vehicle V stored in association with the candidate connection position D, it is determined that the vehicle V can reach the candidate connection position Pn. Computation of the reachable path is performed on the basis of information on the vehicle position and specifications of the vehicle V. Reachable paths are sequentially computed from the side of a candidate connection position D that involves less turns of the vehicle V and is closer to the initial position P0 of the vehicle V.

If the vehicle V can be moved from the initial position P0 and arranged in a predetermined vehicle orientation Vf at the candidate connection position D, then, the vehicle V can be moved into the parking space 20 by inversely following the pull-out path. Thus, the reachable path computing unit 13 sets, among the plurality of candidate connection positions D on the pull-out path, a candidate connection position D at which the vehicle V can be arranged in a predetermined vehicle orientation Vf from the initial position P0, as a park-out position E, and computes a reachable path of from the initial position P0 to the park-out position E.

Figure 8:
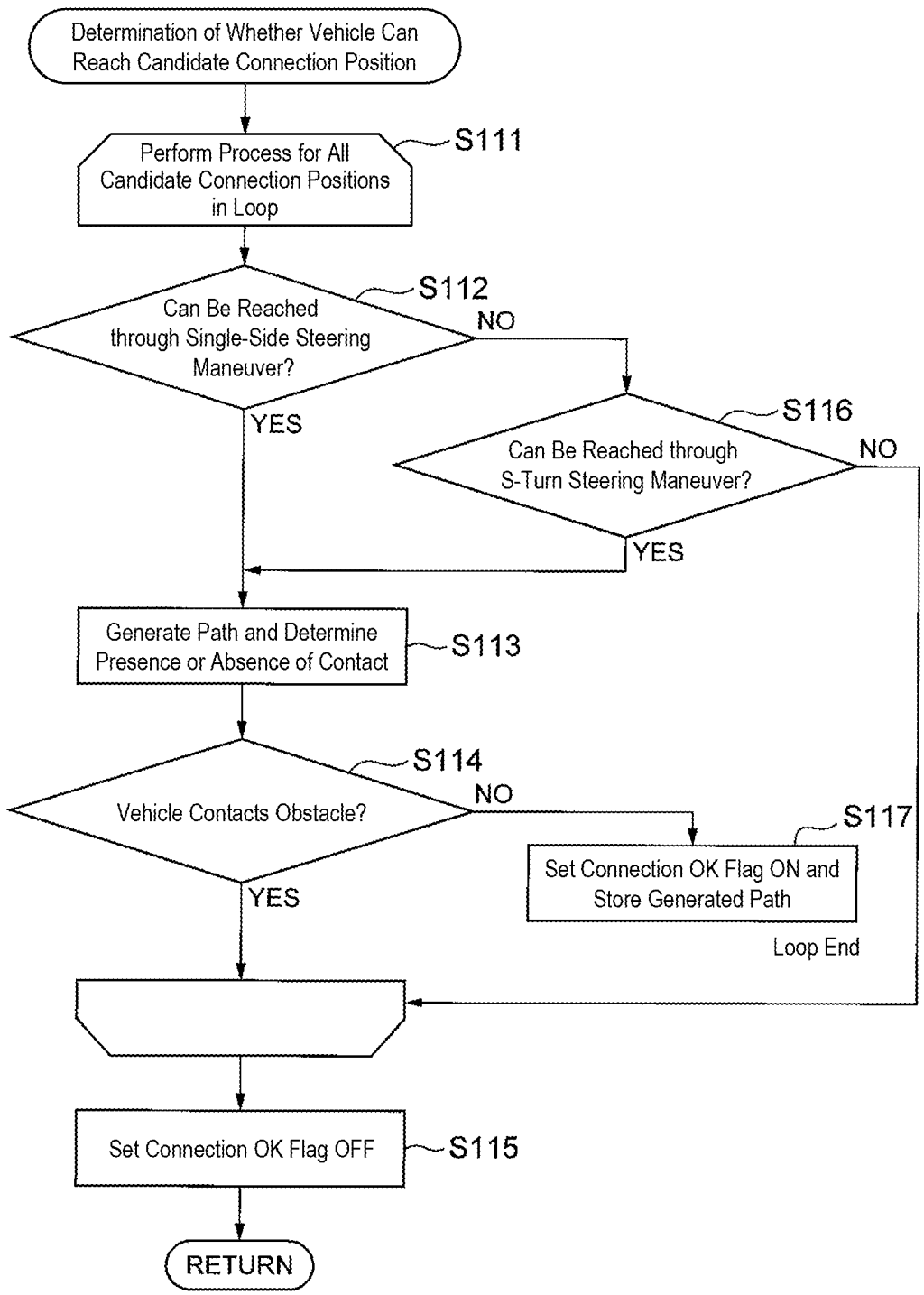
FIG. 8 is a process flow for determining whether a vehicle can reach a candidate connection position.

FIG. 8 is a process flow for determining whether the vehicle V can reach the candidate connection position D.

This process flow is performed for all candidate connection positions in a loop (S111). First, whether the vehicle V can reach the candidate connection position D from the initial position P0 through a single-side steering maneuver is determined (S112). The "single-side steering maneuver" as referred to herein is an operation of turning the steering wheel of the vehicle V to only one of the right or left side of the vehicle V. If it is determined that the vehicle V cannot reach the candidate connection position D through a single-side steering maneuver, then, whether the vehicle V can reach the candidate connection position Pn through an S-turn steering maneuver is determined (S116). The "S-turn steering maneuver" as referred to herein is an operation of turning the steering wheel of the vehicle V to both the right and left sides of the vehicle V.

If it is determined that the vehicle V can reach the candidate connection position D through a single-side steering maneuver or an S-turn steering maneuver, such candidate connection position is selected as a park-out position E, and a reachable path of from the initial position P0 of the vehicle V to the park-out position E is generated (S113).

Then, whether the vehicle V contacts an obstacle on the reachable path is determined (S114). If it is determined that the vehicle V does not contact the obstacle, the connection OK flag is set ON and the generated reachable path is stored in a storage, and thus, the loop terminates (S117). Meanwhile, if it is determined that the vehicle V cannot reach the candidate connection position D through a single-side steering maneuver or an S-turn steering maneuver (NO in S112 and S116), or if it is determined that the vehicle V contacts the obstacle (YES in S114), the determination for the relevant candidate connection position D terminates, and determination for the other remaining candidate connection positions D is performed. Then, if it is determined that the vehicle V cannot reach any of the candidate connection positions D, the connection OK flag is set OFF (S115), and the process flow terminates.

Figure 9A:
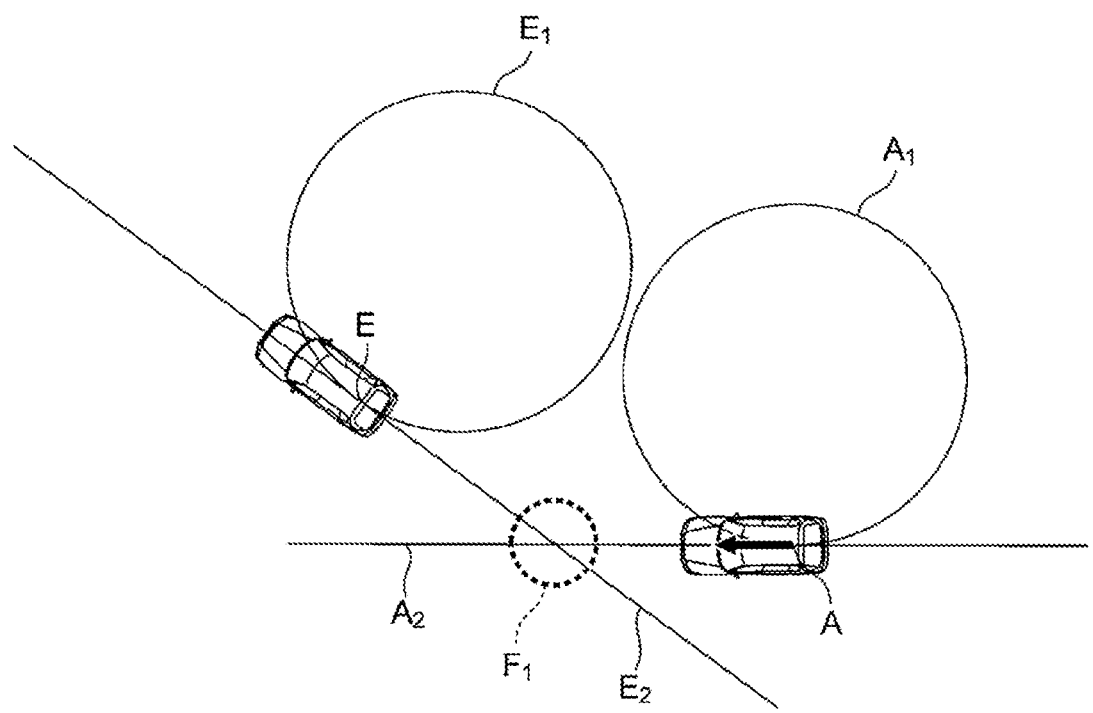
FIG. 9A illustrates an example of determination of whether the vehicle can reach the candidate connection position through a single-side steering maneuver.
Figure 9B:
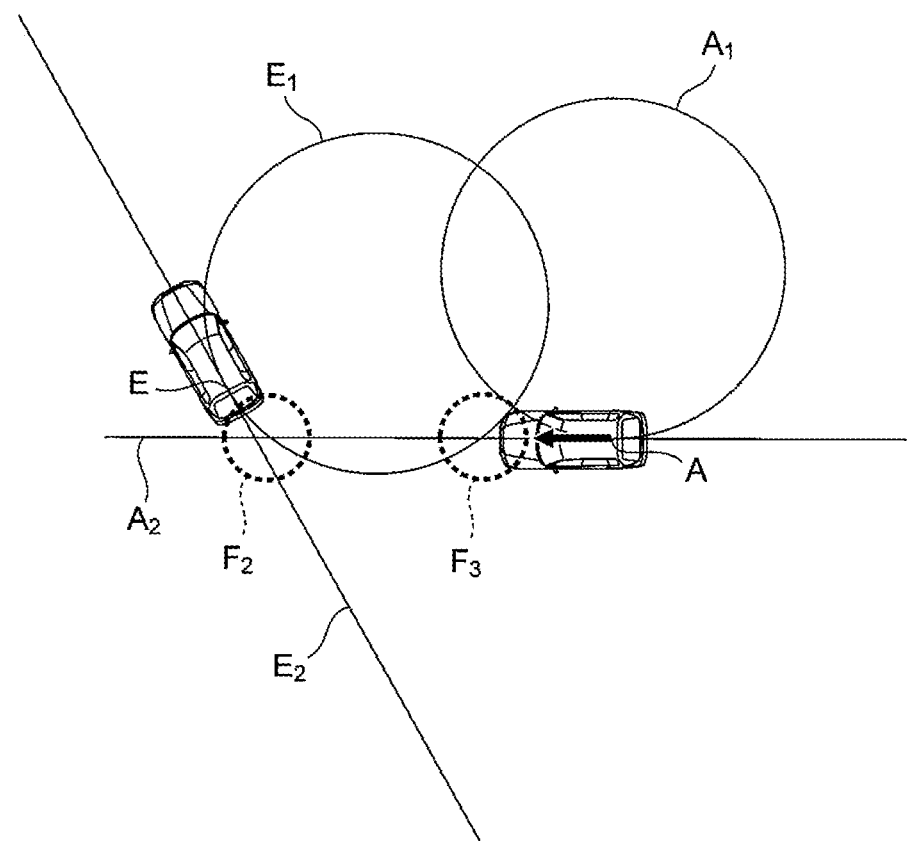
FIG. 9B illustrates an example of determination of whether the vehicle can reach the candidate connection position through a single-side steering maneuver.
Figure 9C:
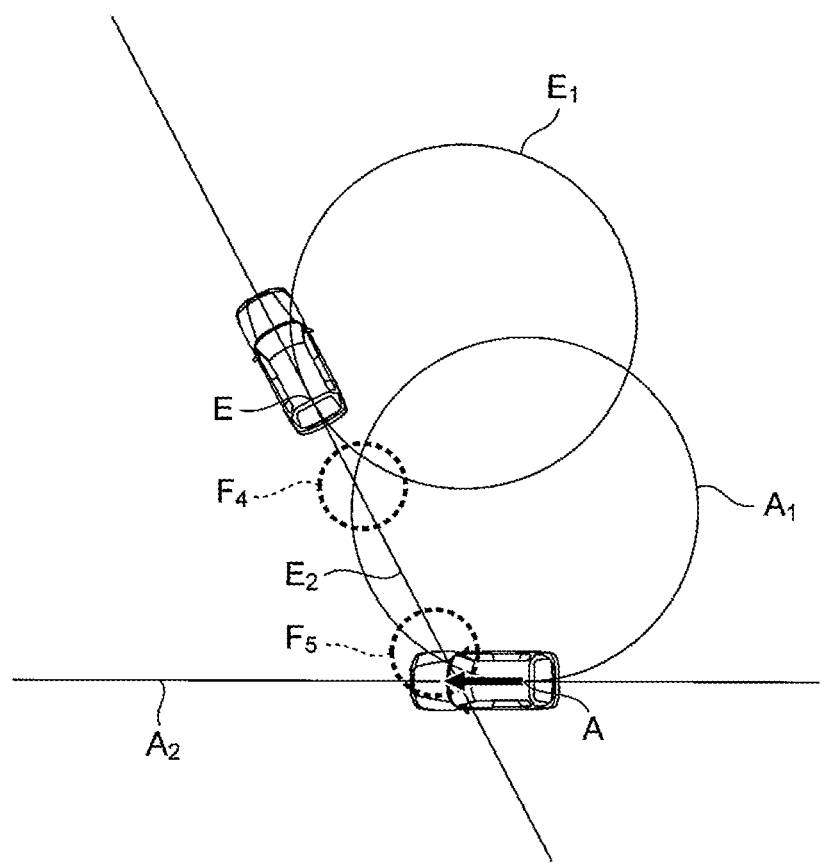
FIG. 9C illustrates an example of determination of whether the vehicle can reach the candidate connection position through a single-side steering maneuver.
Figure 9D:
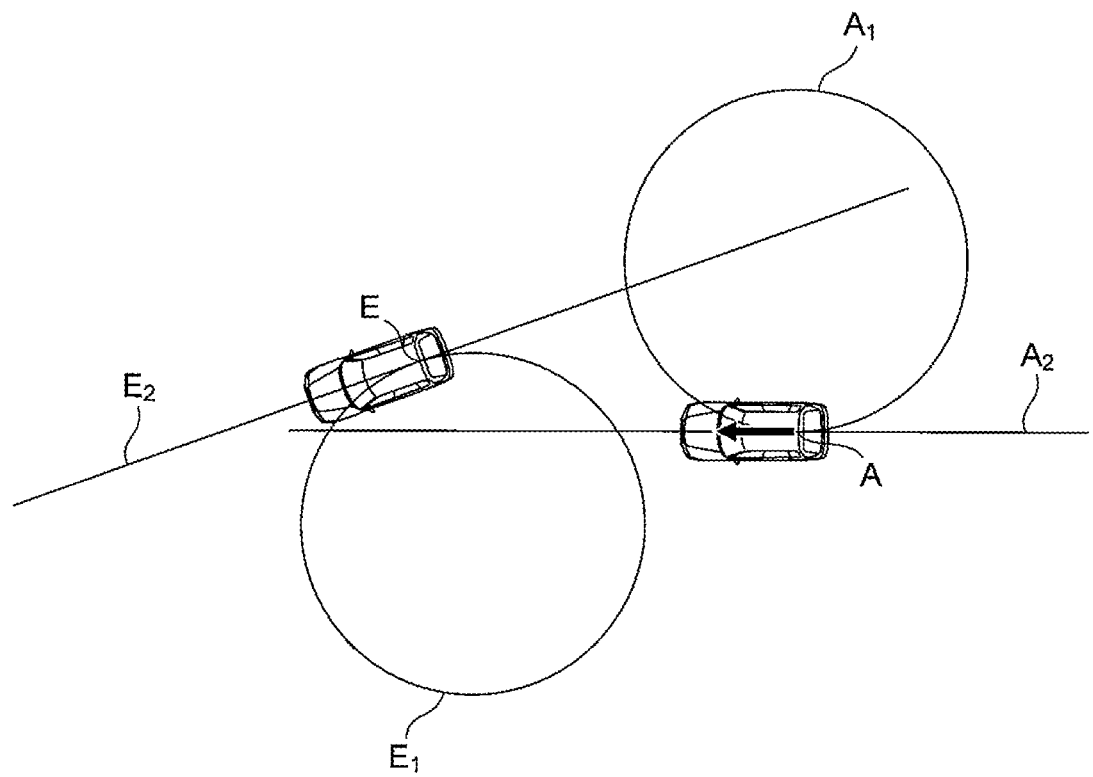
FIG. 9D illustrates an example of determination of whether the vehicle can reach the candidate connection position through an S-turn steering maneuver.
Figure 9E:
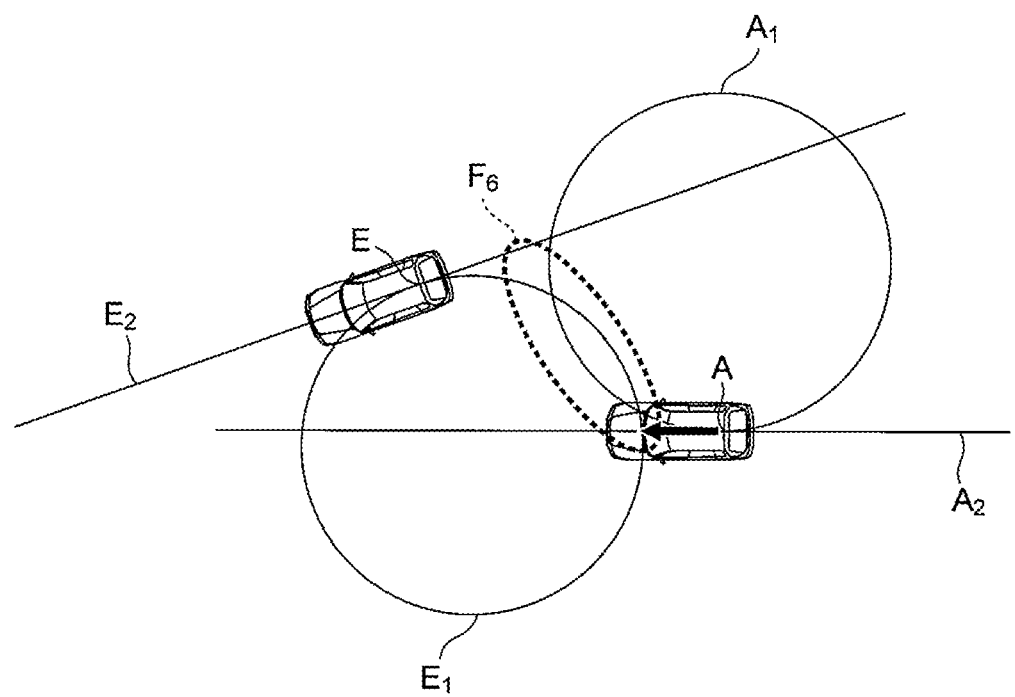
FIG. 9E illustrates an example of determination of whether the vehicle can reach the candidate connection position through an S-turn steering maneuver.

FIGS. 9A to 9C each illustrate an example of determination of whether the vehicle V can reach a candidate connection position through a single-side steering maneuver. FIGS. 9D and 9E each illustrate an example of determination of whether the vehicle V can reach a candidate connection position through an S-turn steering maneuver.

In the determination of whether the vehicle V can reach a candidate connection position through a single-side steering maneuver in S112, it is determined that the vehicle V can reach the candidate connection position if all of the following conditions (a1) to (a3) are satisfied (i.e., restrictions regarding the angular difference and positions are also imposed).

(a1) An axis (vehicle orientation) A2 of the vehicle V at the current position A (i.e., initial position P0) intersects an axis (vehicle orientation) E2 of the vehicle V at a candidate connection position E.

(a2) A turning circle A1 at the current position A does not intersect the axis E2 at the candidate connection position E.

(a3) A turning circle E1 at the candidate connection position E does not intersect the axis A2 at the current position A.

It should be noted that a "turning circle" herein means an arc on the turning side with the clothoid curve taken into consideration (i.e., minimum turning trajectory).

In the example illustrated in FIG. 9A, the aforementioned condition (a1) is satisfied since the axes A2 and E2 intersect at a position of intersection F1. Therefore, it is determined that the vehicle V can reach the candidate connection position through a single-side steering maneuver. Meanwhile, in FIG. 9B, the aforementioned condition (a3) is not satisfied since the turning circle E1 intersects the axis A2. In addition, in the example illustrated in FIG. 9C, the aforementioned condition (a2) is not satisfied since the turning circle A1 intersects the axis E2. Therefore, in the example illustrated in FIGS. 9B and 9C, it is determined that the vehicle V cannot reach the candidate connection position through a single-side steering maneuver, and the process proceeds to determination of whether an S-turn steering maneuver can be used.

In the determination of whether the vehicle V can reach the candidate connection position through an S-turn steering maneuver in S116, it is determined that the vehicle V can reach the candidate connection position if the following condition (a4) is satisfied (i.e., restrictions regarding the angular difference and positions are also imposed).

(a4) The turning circle A1 at the current position A and the turning circle E1 at the candidate connection position E do not intersect.

In the example illustrated in FIG. 9D, the aforementioned condition (a4) is satisfied since the turning circle A1 and the turning circle E1 do not intersect. Therefore, it is determined that the vehicle V can reach the candidate connection position through an S-turn steering maneuver. Meanwhile, in the example illustrated in FIG. 9E, the aforementioned condition (a4) is not satisfied since the turning circle A1 and the turning circle E1 intersect. Therefore, it is determined that the vehicle B cannot reach the candidate connection position through an S-turn steering maneuver.

Figure 10:
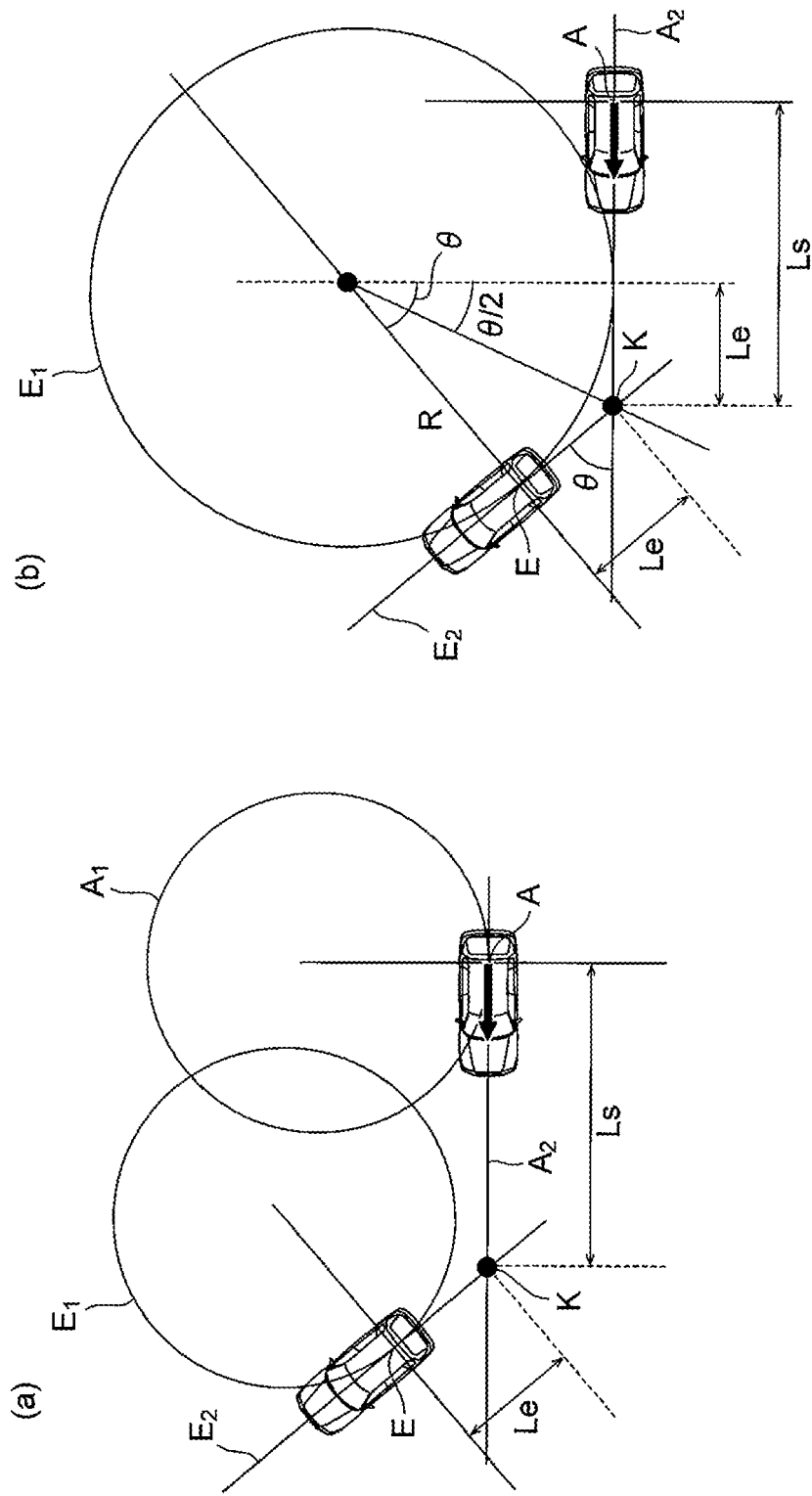
FIG. 10 illustrate a method of generating a forward path that requires only a single-side steering maneuver.

FIG. 10 illustrate a method of generating a reachable path that requires only a single-side steering maneuver. To generate a reachable path of from the current position A to the candidate connection position E that requires only a single-side steering maneuver, first, as illustrated in FIG. 10(a), the distance Ls between the intersection K between the axis A2 and the axis E2 and the current position A, and the distance Le between the intersection K and the candidate connection position E are computed, and the shorter distance is selected (i.e., the distance Le is selected in the example illustrated in the drawing). Then, as illustrated in FIG. 12(b), a circle having both the two axes A2 and E2 as tangents and passing through a point that is away from the intersection K by the shorter distance is depicted, and the radius R of the circle is computed through geometric computation using Formula (1) below.

[Formula 1]
$$R = \frac{L_e}{\tan\frac{\theta}{2}} \quad (1)$$

This can generate a reachable path that combines a straight line and an arc.

Figure 11:
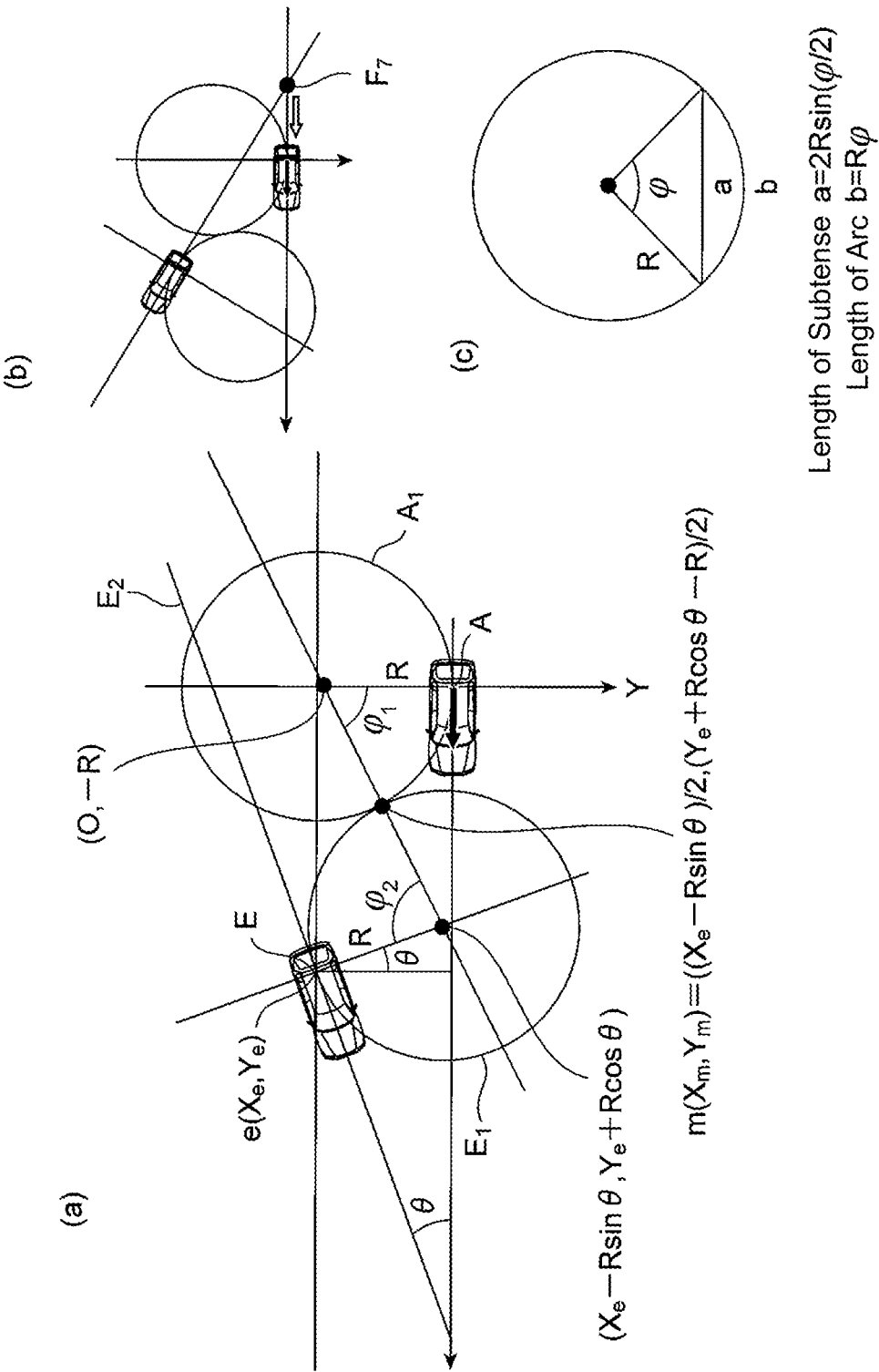
FIG. 11 illustrate a method of generating a forward path that requires an S-turn steering maneuver.

FIG. 11 illustrate a method of generating a reachable path that requires an S-turn steering maneuver, and illustrate a generation method when the axis E2 does not intersect the X-axis, which is the axis A2 at the current position A, at a position behind the candidate connection position E.

Herein, the radii R, which are identical, of the two turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 2]
$$2R = \sqrt{(X_e - R\sin\theta)^2 + (Y_e + R\cos\theta + R)^2} \quad (2)$$

[Formula 3]
$$R = \frac{X_e\sin\theta - Y_e(1+\cos\theta) - \sqrt{\{X_e\sin\theta - Y_e(1+\cos\theta)\}^2 - 2(\cos\theta-1)(X_e^2 + Y_e^2)}}{2(\cos\theta - 1)} \quad (3)$$

It should be noted that when θ=0,

[Formula 4]
$$R = -\frac{X_e^2 + Y_e^2}{4Y_e} \quad (4)$$

The position of the intersection illustrated in FIG. 11(*a*) to the position of the intersection F7 illustrated in FIG. 11(*b*) can be computed from the aforementioned computational formulae.

From the formulae shown in FIG. 11(*c*), the turning angles $\phi_1$ and $\phi_2$ and the arc lengths $b_1$ and $b_2$ of the two circle of the S-shape be determined using the following computational formulae.

[Formula 5]
$$\varphi_1 = 2\sin^{-1}\left(\frac{\sqrt{X_m^2 + Y_m^2}}{2R}\right) \quad (5)$$

[Formula 6]
$$b_1 = 2R\sin^{-1}\left(\frac{\sqrt{X_m^2 + Y_m^2}}{2R}\right) \quad (6)$$

[Formula 7]
$$\varphi_2 = 2\sin^{-1}\left(\frac{\sqrt{(X_m - X_e)^2 + (Y_m - Y_e)^2}}{2R}\right) \quad (7)$$

[Formula 8]
$$b_2 = 2\sin^{-1}\left(\frac{\sqrt{(X_m - X_e)^2 + (Y_m - Y_e)^2}}{2R}\right) \quad (8)$$

Figure 12:
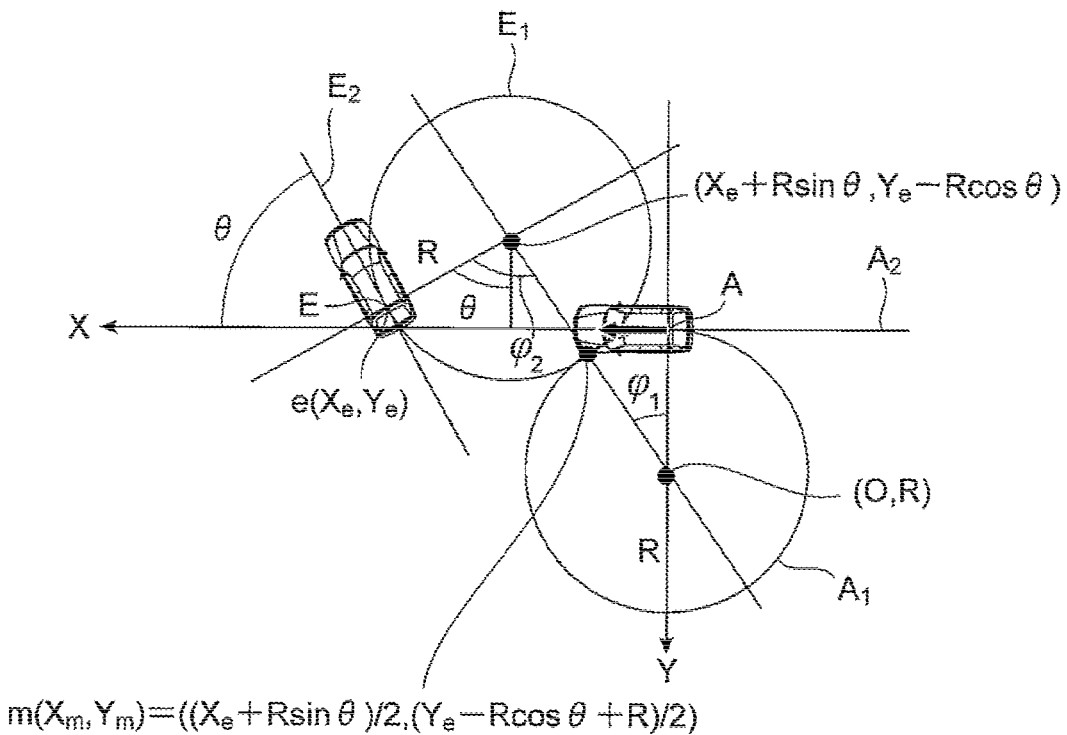
FIG. 12 illustrates a method of generating a forward path that requires an S-turn steering maneuver.

FIG. 12 illustrates an exemplary method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 9]
$$2R = \sqrt{(X_e + R\sin\theta)^2 + (Y_e - R\cos\theta - R)^2} \quad (9)$$

[Formula 10]
$$R = \frac{-\{X_e\sin\theta - Y_e(1+\cos\theta)\} - \sqrt{\{X_e\sin\theta - Y_e(1+\cos\theta)\}^2 - 2(\cos\theta-1)(X_e^2 + Y_e^2)}}{2(\cos\theta - 1)} \quad (10)$$

From the formulae shown in FIG. 11(*c*), the turning angles $\phi_1$ and $\phi_2$ and the arc lengths $b_1$ and $b_2$ of the two circles of the S-shape can be determined using the following computational formulae.

[Formula 11]
$$\varphi_1 = 2\sin^{-1}\left(\frac{\sqrt{X_m^2 + Y_m^2}}{2R}\right) \quad (11)$$

[Formula 12]
$$b_1 = 2R\sin^{-1}\left(\frac{\sqrt{X_m^2 + Y_m^2}}{2R}\right) \quad (12)$$

[Formula 13]
$$\varphi_2 = 2\sin^{-1}\left(\frac{\sqrt{(X_m - X_e)^2 + (Y_m - Y_e)^2}}{2R}\right) \quad (13)$$

[Formula 14]
$$b_2 = 2R\sin^{-1}\left(\frac{\sqrt{(X_m - X_e)^2 + (Y_m - Y_e)^2}}{2R}\right) \quad (14)$$

Figure 13:
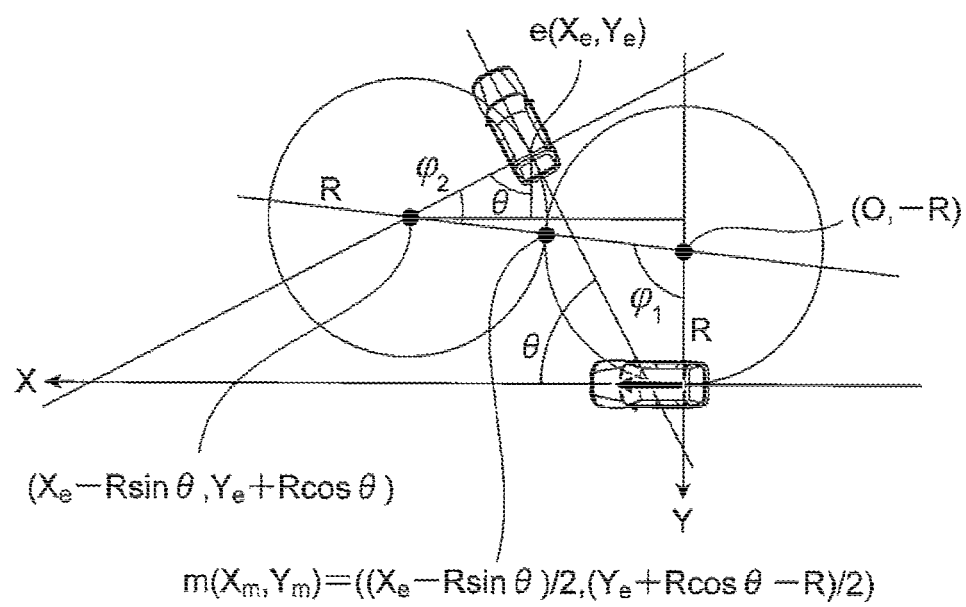
FIG. 13 illustrates a method of generating a forward path that requires an S-turn steering maneuver.

FIG. 13 illustrates a method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 15]

$$2R = \sqrt{(X_e - R\sin\theta)^2 + (Y_e + R\cos\theta + R)^2} \quad (15)$$

[Formula 16]

$$R = \frac{X_e \sin\theta - Y_e(1 + \cos\theta) - \sqrt{\{X_e\sin\theta - Y_e(1+\cos\theta)\}^2 - 2(\cos\theta - 1)(X_e^2 + Y_e^2)}}{2(\cos\theta - 1)} \quad (16)$$

From the formulae shown in FIG. 11(c), the turning angles $\phi_1$ and $\phi_2$ and the arc lengths $b_1$ and $b_2$ of the two circles of the S-shape can be determined using the following computational formulae.

[Formula 17]

$$\varphi_1 = 2\sin^{-1}\left(\frac{\sqrt{X_m^2 + Y_m^2}}{2R}\right) \quad (17)$$

[Formula 18]

$$b_1 = 2R\sin^{-1}\left(\frac{\sqrt{X_m^2 + Y_m^2}}{2R}\right) \quad (18)$$

[Formula 19]

$$\varphi_2 = 2\sin^{-1}\left(\frac{\sqrt{(X_m - X_e)^2 + (Y_m - Y_e)^2}}{2R}\right) \quad (19)$$

[Formula 20]

$$b_2 = 2R\sin^{-1}\left(\frac{\sqrt{(X_m - X_e)^2 + (Y_m - Y_e)^2}}{2R}\right) \quad (20)$$

<Parking Path Setting Unit>

The parking path setting unit 14 sets a parking path using information on the pull-out path of from the target parking position P1 to the park-out position E and information on the reachable path of from the initial position P0 of the vehicle V to the park-out position E. The parking path setting unit 14 forms a parking path by connecting the reachable path, which has been generated by setting the connection OK flag ON in step S117 of FIG. 10, and the pull-out path including the park-out position E connecting to the reachable path.

When it is possible to set a plurality of parking paths, a parking path is selected according to various evaluation values, such as a parking time, the presence or absence of a vehicle behind, the accuracy of parking, the width of a road, and a preference of a driver. For example, the accuracy of the parking position is higher when the vehicle V moves straight into the parking space 20 after the orientation of the vehicle V has been aligned with the parking orientation 26 than when the vehicle enters the parking space 20 while turning. Therefore, when the accuracy of the parking position is prioritized, a parking path is selected that allows the vehicle V to move straight into the parking space 20 after the orientation of the vehicle V has been aligned with the parking orientation 26.

In addition, when the vehicle V is parked into the parking space 20 from the park-out position E, for example, the time needed for parking can be shortened as the number of turns of the vehicle V in the forward and backward directions as well as the number of steering maneuvers is smaller. Therefore, to shorten the time needed for parking, a parking path is selected that requires less turns of the vehicle V in the forward and backward directions as well as less steering maneuvers as much as possible.

Further, when parking the vehicle V, for example, the driver's intention to park the vehicle V in the parking space 20 can be more clearly conveyed to another vehicle behind the vehicle V when the vehicle V is at a position closer to the parking space 20 than when the vehicle V moves to a position away from the parking space 20. Therefore, when there is another vehicle behind the vehicle V on the road 21, a parking path is selected that allows the vehicle V to be closer to the parking space 20.

As described above, the parking assistance device 1 computes a pull-out path from the target parking position P1, and selects, from among a plurality of candidate connection positions D set on the pull-out path, a candidate connection position D that can be reached by the vehicle at the initial position P0 and is closest to the vehicle as the park-out position E, and then sets a parking path using the pull-out path of from the target parking position B to the park-out position E and the reachable path of from the initial position P0 of the vehicle V to the park-out position E. Therefore, a parking path that includes turns of the vehicle V for guiding the vehicle V to the target parking position B is computed independently of the start position or vehicle attitude when parking assistance is started, and the vehicle V can be parked at the position intended by the driver and in a correct vehicle attitude.

Next, repositioning of the vehicle V will be described.

The aforementioned parking assistance device 1 can compute a parking path that can guide the vehicle V into the parking space 20, arrange the position Vo of the vehicle V at the target parking position P1 in the parking space 20, and allow the vehicle orientation Vf of the vehicle V to coincide with the parking orientation 26. However, when the vehicle V is actually moved along the parking path, positional deviations may occur due to various factors, such as the accuracy or errors of a sensor, and delays in turning the steering wheel during the parking operation. The parking assistance device 1 of the present embodiment assists in, when the vehicle V has a positional deviation as a result of having been parked along the parking path, repositioning the vehicle V by computing a path for correcting the positional deviation.

<Positional Deviation Determination Unit>

Figure 14:
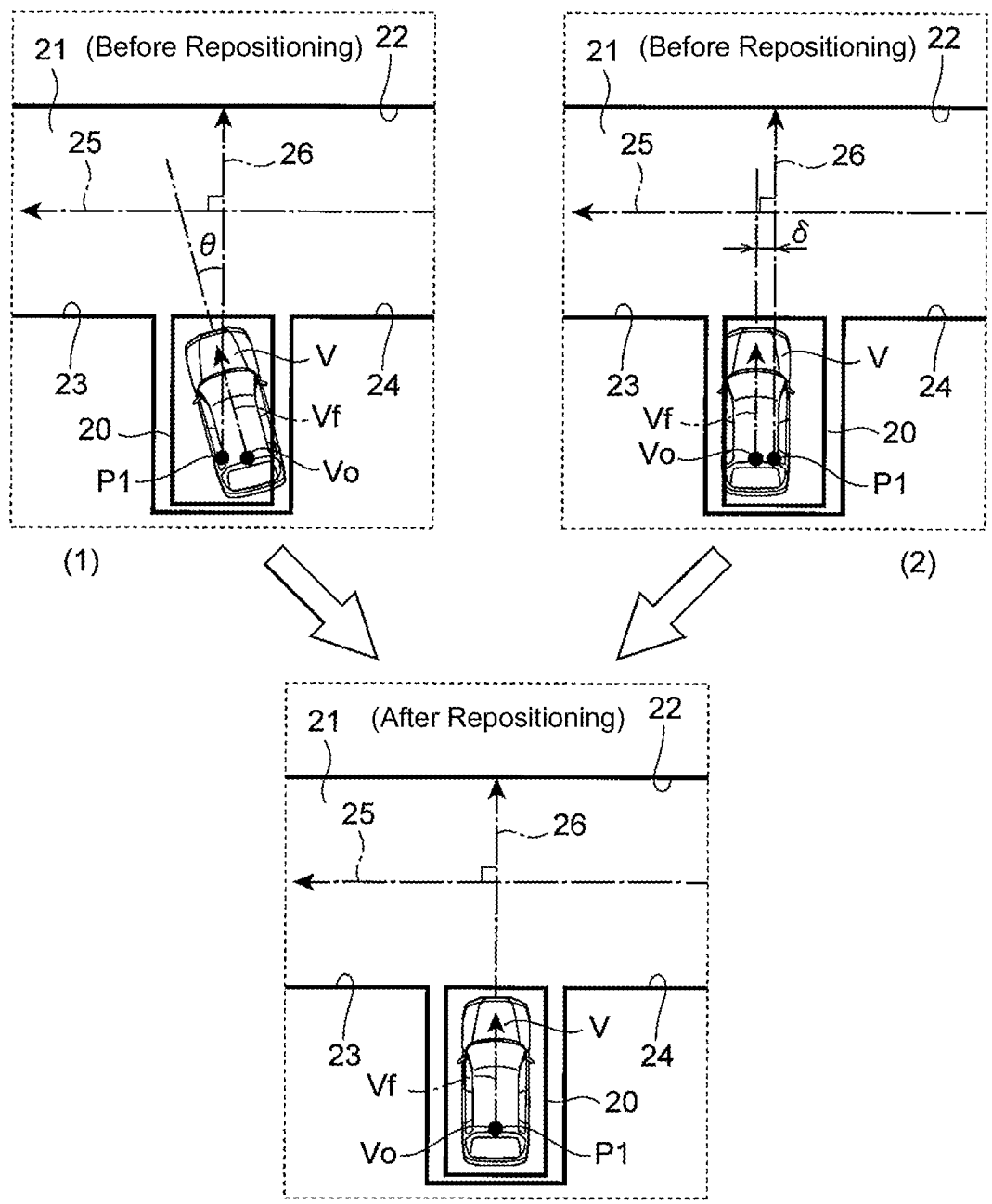
FIG. 14 illustrate the state of a vehicle before and after it is repositioned.

FIG. 14 illustrate the state of the vehicle V before and after it is repositioned. Although the following description illustrates an example of back-in perpendicular parking, the present embodiment is similarly applicable to front-in perpendicular parking.

The positional deviation determination unit 15 determines whether there is any positional deviation between the vehicle V and the parking space 20. The positional deviation determination unit 15 determines that there is a positional deviation if at least one of the following two conditions is satisfied: the actual gap distance δ between the position Vo of the vehicle V and the target parking position P1 in the parking space 20 is greater than or equal to a predetermined value, or if the angle θ between the vehicle orientation Vf of the vehicle V and the parking orientation 26 of the parking space 20 is greater than or equal to a predetermined value. Information on the position Vo of the vehicle V with respect to the target parking position P1 and the vehicle orientation Vf with respect to the parking orientation 26 can be obtained from the vehicle position information 194.

In the example illustrated FIG. 14(1) before repositioning, the vehicle orientation Vf of the vehicle V is inclined with respect to the parking orientation 26 of the parking space 20 by a degree greater than or equal to a predetermined value, and also, the position Vo of the vehicle V is away from the target parking position P1 in the parking space 20 by an amount greater than or equal to a predetermined value. Thus, a positional deviation is determined to be present. In the example illustrated in FIG. 14(2) before repositioning, the vehicle orientation Vf of the vehicle V is parallel with the parking orientation 26 of the parking space 20, but the reference point Vo of the vehicle V is away from the target parking position P1 in the parking space 20 by an amount greater than or equal to a predetermined value. Thus, a positional deviation is determined to be present. In addition, though not illustrated, a positional deviation is also determined to be present if the vehicle V is stopping at around the parking space 20.

The parking assistance device 1 determines that parking is complete after the operation of parking the vehicle V is started along the parking path that has been set by the parking path setting unit 14 and the operation terminates. The operation of parking the vehicle V terminates after the vehicle V has reached the end point of the parking path, but also terminates when the position Vo of the vehicle V does not coincide with the target parking position P1 or when the vehicle orientation Vf of the vehicle V does not coincide with the parking orientation 26 of the parking space 20 as a result of the vehicle V having been guided, or when an obstacle is detected during the parking operation and the operation is thus halted. The positional deviation determination unit 15 determines if there is any positional deviation upon termination of the operation of parking the vehicle V using the parking path or upon receiving an instruction from a driver through an operation after the termination of the parking operation.

<Repositioning Path Computing Unit>

The repositioning path computing unit 16 computes a repositioning path for correcting a positional deviation when a positional deviation has been determined to be present by the positional deviation determination unit 15. The repositioning path includes a pull-out path for once pulling the vehicle V out of the parking space 20 and moving it to the road 21, or moving the vehicle V from a position around the parking space 20 to a position on the road 21 outside of the parking space 20; and a pull-in path for moving the vehicle V from the road 21 to the target parking position P1 in the parking space 20.

The vehicle V can have corrected positional deviations by being moved along the repositioning path. That is, as illustrated in the example of FIG. 14 after repositioning, the actual gap distance δ between the position Vo of the vehicle V and the target parking position P1 in the parking space 20 becomes less than the predetermined value, and also, the angle θ between the vehicle orientation Vf of the vehicle V and the parking orientation 26 of the parking space 20 becomes less than the predetermined value.

The repositioning path computing unit 16 includes a first repositioning path computing unit and a second repositioning path computing unit. The first repositioning path computing unit computes a first repositioning path for correcting a positional deviation only through a single-side steering maneuver (see FIG. 15), and the second repositioning path computing unit computes a second repositioning path for correcting a positional deviation through an S-turn steering maneuver (see FIG. 19).

<First Repositioning Path Computing Unit>

Figure 15:
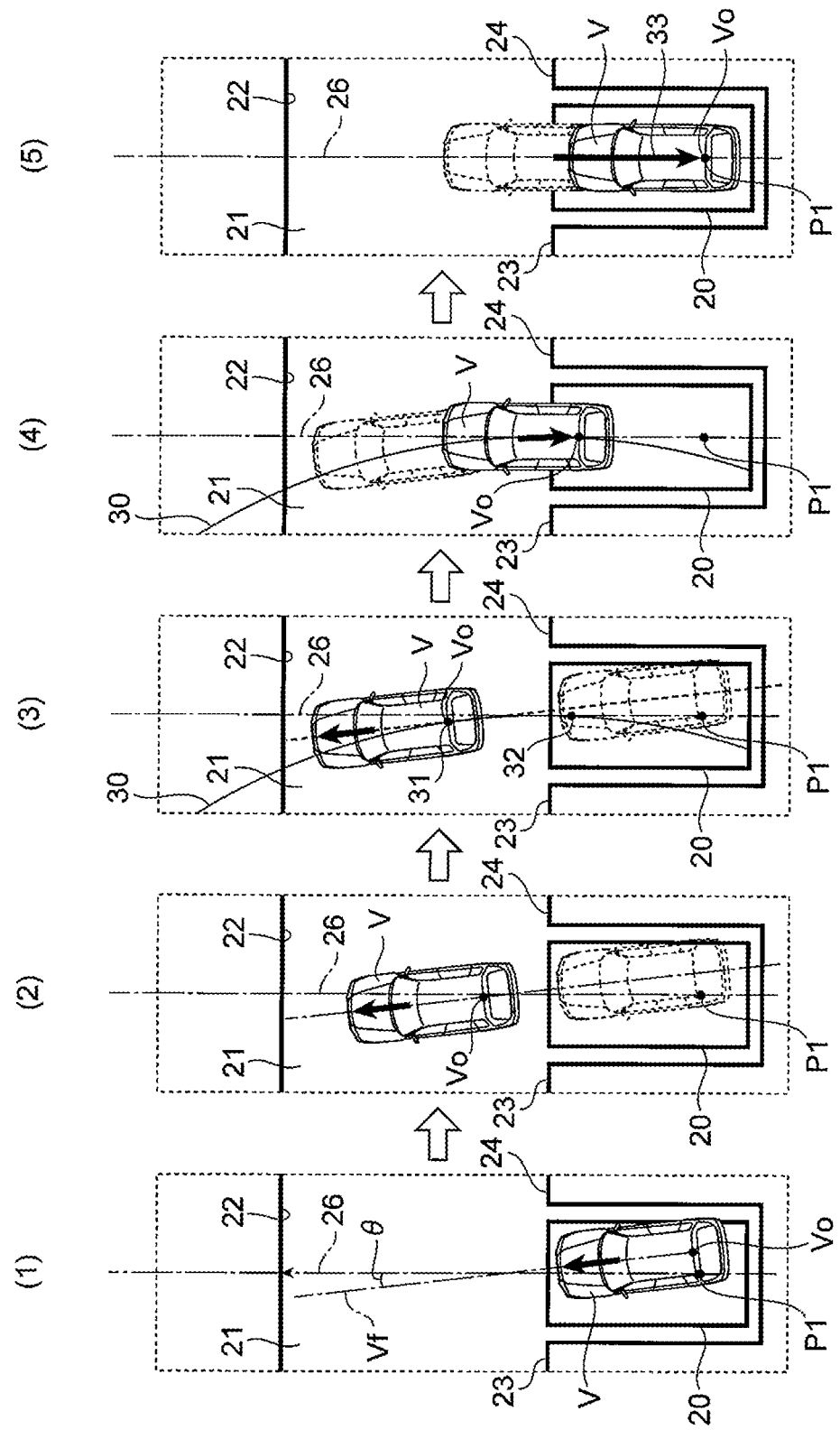
FIG. 15 illustrate a repositioning operation performed along a first repositioning path.
Figure 16:
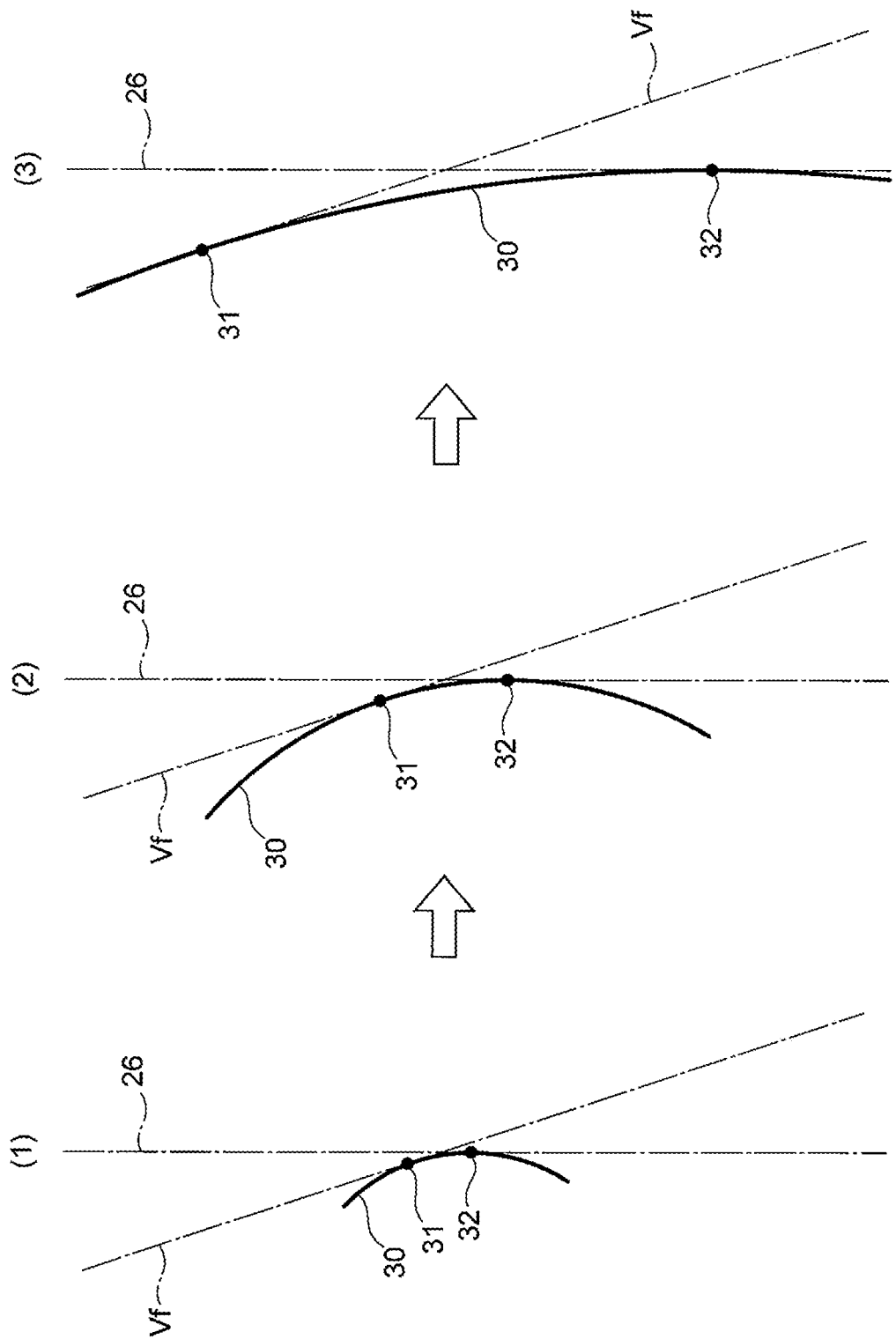
FIG. 16 illustrate images of a circle that is gradually computed along with a movement of a vehicle.
Figure 17:
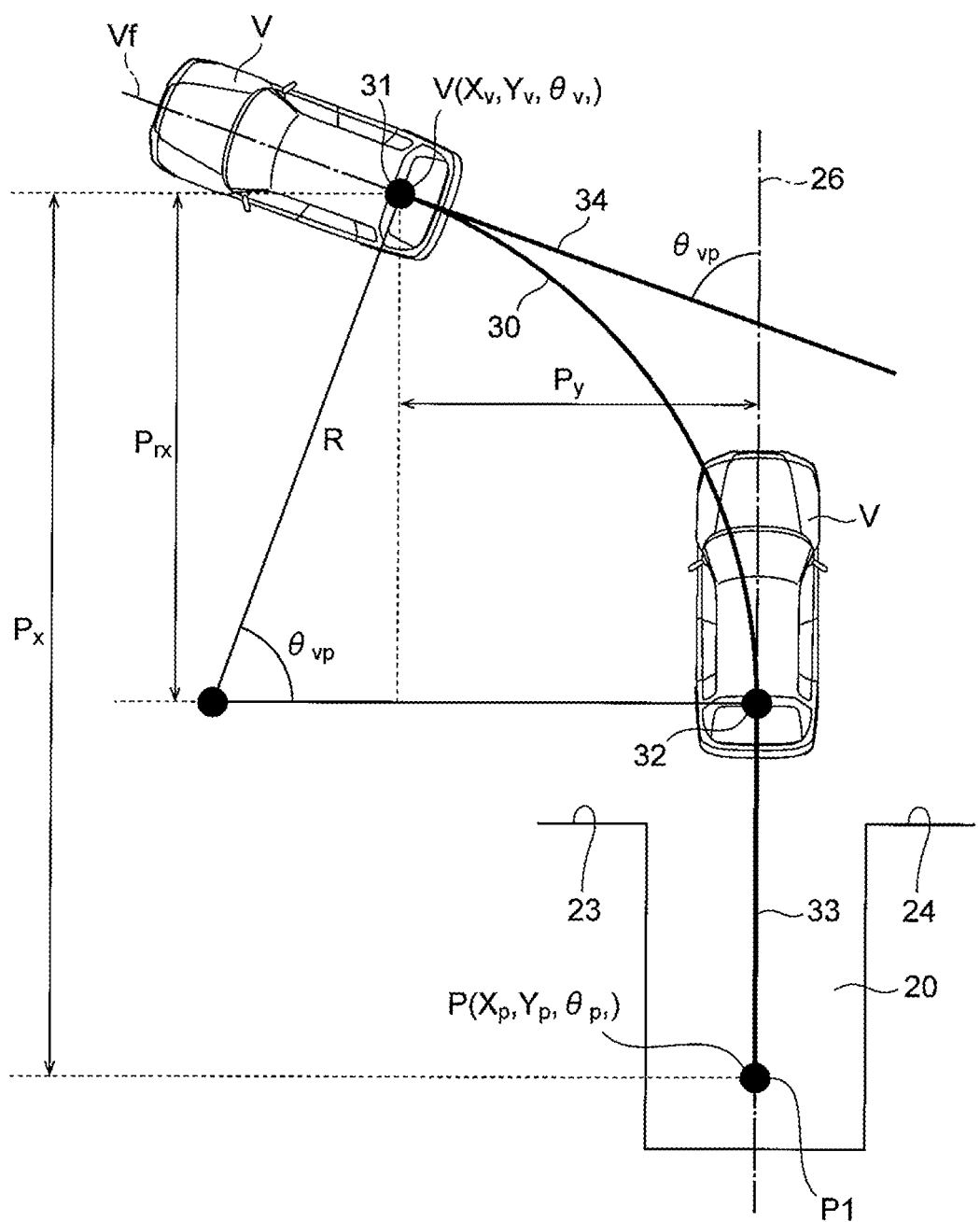
FIG. 17 illustrates a method of computing a pull-in path.

FIG. 15 illustrate a repositioning operation performed along the first repositioning path. FIG. 16 illustrate images of a circle that is gradually computed along with a movement of the vehicle V. FIG. 17 illustrates a method of computing a pull-in path.

The first repositioning path computing unit computes a pull-out path for moving the vehicle V straight from its parked position to a position on the road 21, and a pull-in path for moving the vehicle V from the position on the road 21 into the parking space 20 while turning the vehicle V to one of the right or left side, and then computes the first repositioning path by connecting the pull-out path and the pull-in path.

The first repositioning path computing unit computes a circle 30 that has both the vehicle orientation Vf of the vehicle V and the parking orientation 26 of the parking space 20 as tangents. Then, the first repositioning path computing unit computes as a pull-out path a path obtained by connecting the parked position of the vehicle V to a first point of tangency 31 between the circle 30 and the vehicle orientation Vf of the vehicle V located on the road 21, along the vehicle orientation Vf of the vehicle V using a straight line. Then, the first repositioning path computing unit computes as a pull-in path each of a path obtained by connecting the first point of tangency 31 to a second point of tangency 32 between the circle 30 and the parking orientation 26 of the parking space 20, along the circle 30 using an arc, and a path obtained by connecting the second point of tangency 32 to the target parking position P1, along the parking orientation 26 of the parking space 20 using a straight line.

The pull-out path has a path for moving the vehicle V straight along the vehicle orientation Vf of the vehicle V in the direction away from the parking space 20 (FIG. 15(1)) so that the position Vo of the vehicle V passes beyond the parking orientation 26 of the parking space 20 (FIG. 15(2)) and reaches the first point of tangency 31 of the circle 30. The circle 30 is a circle contacting both the vehicle orientation Vf of the vehicle V and the parking orientation 26 of the parking space 20, and contacts the vehicle direction Vf at the first point of tangency 31, and contacts the parking orientation 26 at the second point of tangency 32.

The pull-in path has a path for moving the vehicle V from the first point of tangency 31 to the second point of tangency 32 while turning it along the circle 30 in the direction toward the parking space 20 (FIG. 15(4)), and moving the vehicle V straight from the second point of tangency 32 along the parking orientation 26 in the direction toward the parking space 20 so that the position Vo of the vehicle V is arranged at the target parking position P1, and the vehicle orientation Vf of the vehicle V is arranged along the parking orientation 26 of the parking space 20 (FIG. 15(5)).

The circle 30 is sequentially computed along with a movement of the vehicle V from a position where the vehicle V is past the parking orientation 26 of the parking space 20 after having been virtually moved straight along the vehicle orientation Vf of the vehicle V in the direction away from the parking space 20. The circle 30 has a gradually increased diameter as the vehicle V moves along the vehicle orientation Vf as illustrated in FIGS. 16(1) to 16(3).

FIG. 17 illustrates a method of computing the aforementioned circle.

The first repositioning path computing unit computes the circle 30 that satisfies both of the following two conditions (A) and (B).

[Formula 21]

$$R_{min} \leq R = \frac{P_y}{\sin\theta_{vp} \cdot \tan\frac{\theta_{vp}}{2}} \quad (A)$$

$$P_x \geq P_{rx} = \sqrt{R^2 - (R - P_y)^2} \quad (B)$$

It is assumed that the coordinates of the first point of tangency 31 are V(Xv,Yv,θv), the coordinates of the target parking position P1 are P(Xp,Yp,θp), and the angle between the vehicle orientation Vf of the vehicle V and the parking orientation 26 of the parking space 20 is θvp. Symbol Rmin denotes the minimum turning radius of the vehicle V.

Figure 18:
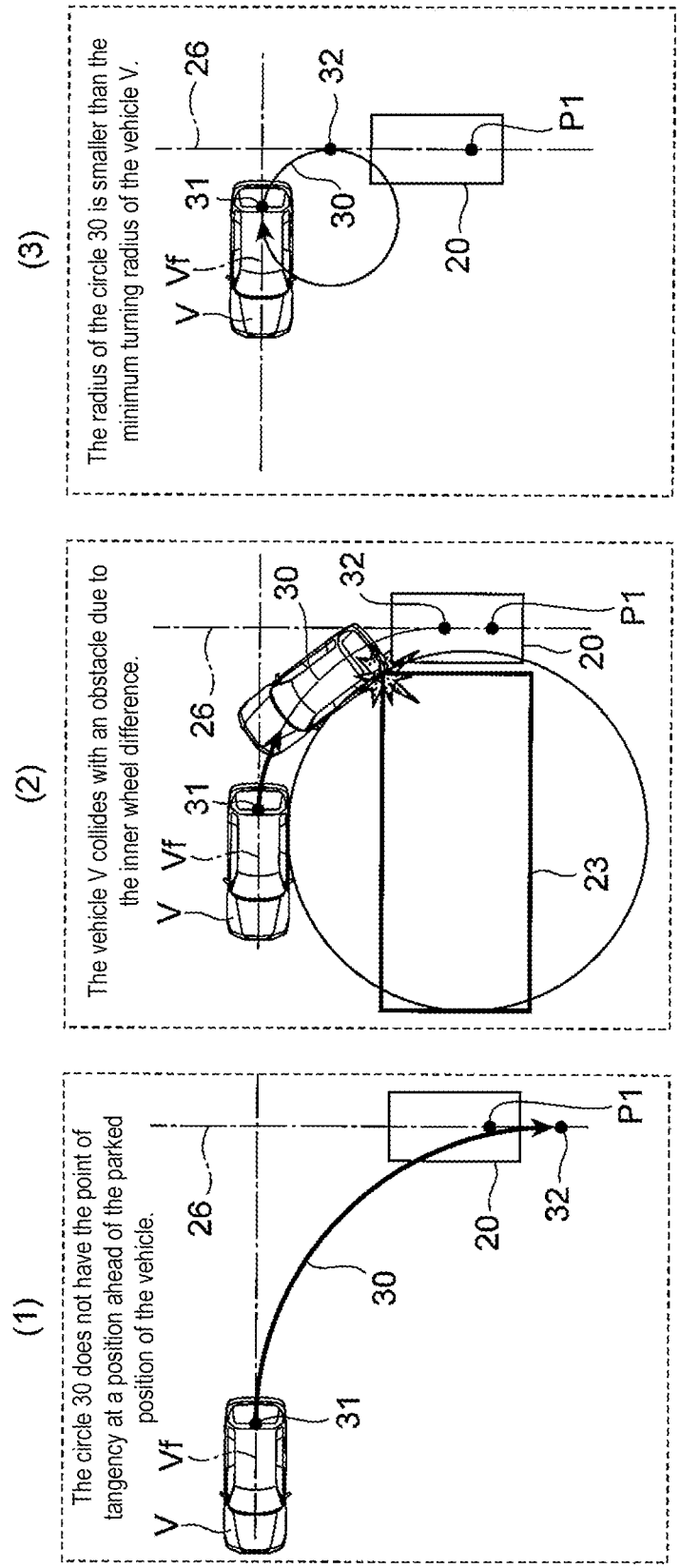
FIG. 18 illustrate parking prohibition conditions.

FIG. 18 illustrate the parking prohibition conditions.

If the circle 30 corresponds to at least one of the following three parking prohibition conditions, the vehicle V cannot be parked in the parking space 20 without positional deviations using a path that uses the circle 30.

(1) The circle 30 cannot have the second point of tangency 32 at a position ahead of the parked position of the vehicle V, that is, the second point of tangency 32 is not located closer to a position outside of the parking space than to the parked position of the vehicle V.

(2) The vehicle V collides with the obstacle 23 due to an inner wheel difference when moved in the direction to enter the parking space along the circle 30.

(3) The radius of the circle 30 is smaller than the minimum turning radius of the vehicle V.

The first repositioning path computing unit sets a pull-out path and a pull-in path using the circle 30 that corresponds to none of the aforementioned three parking prohibition conditions. Specifically, the first repositioning path computing unit sets as a pull-out path a straight line portion of from the parked position of the vehicle V to the first point of tangency 31, and sets as a pull-in path a path obtained by connecting the arc portion between the first point of tangency 31 and the second point of tangency 32 of the circle 30 and a straight line portion 33 of from the second point of tangency 32 to the target parking position P1.

The first repositioning path extends straight from the parked position of the vehicle V to the first point of tangency 31 along the vehicle orientation Vf, and then extends from the first point of tangency 31 to the second point of tangency 32 while turning to the left based on the radius R of the circle 30, and further extends straight from the second point of tangency 32 to the target parking position P1 along the parking orientation 26. Therefore, guiding the vehicle V along the first repositioning path can arrange the vehicle V in the parking space 20 without positional deviations.

<Second Repositioning Path Computing Unit>

Figure 19:
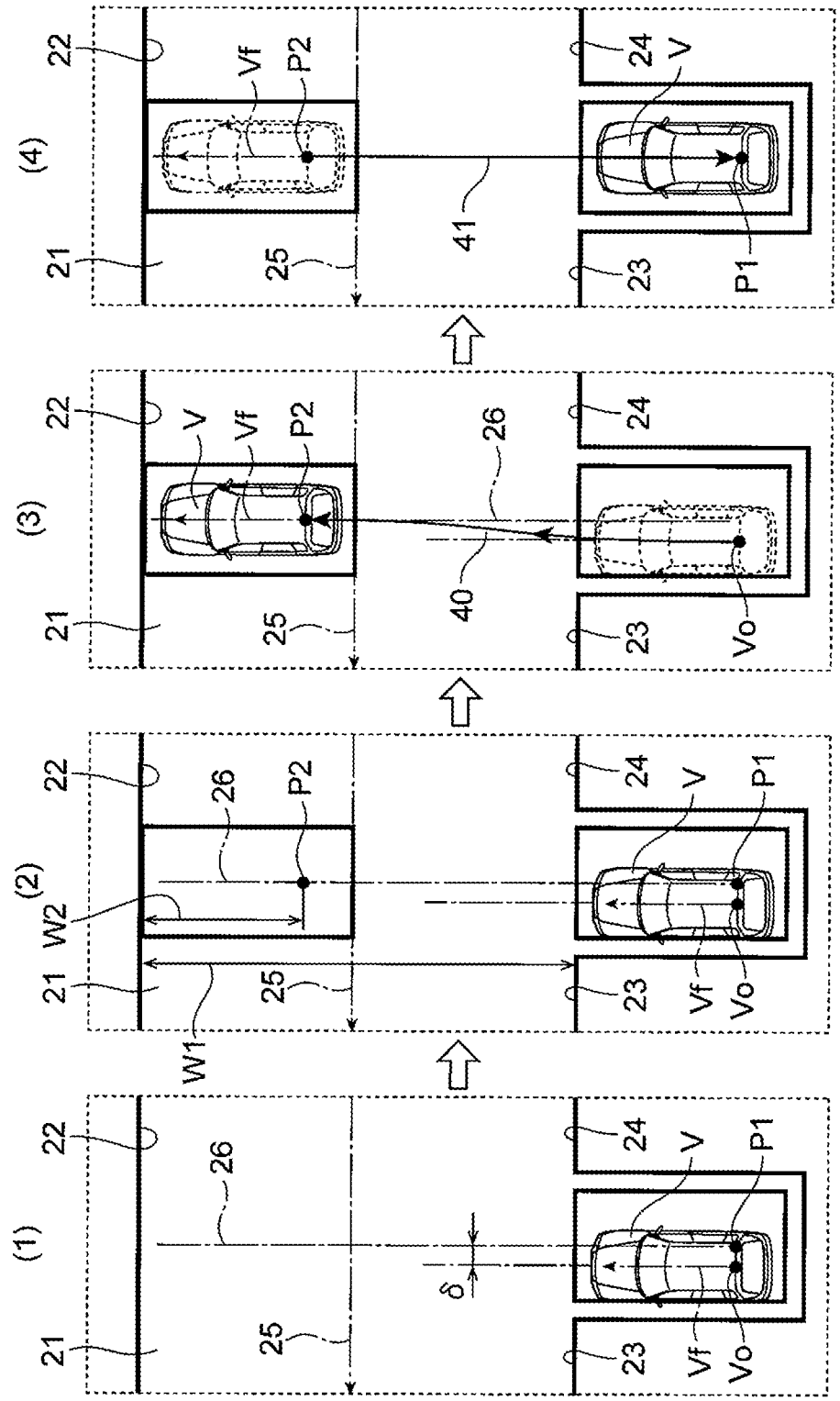
FIG. 19 illustrate a repositioning operation performed along a second repositioning path.
Figure 20:
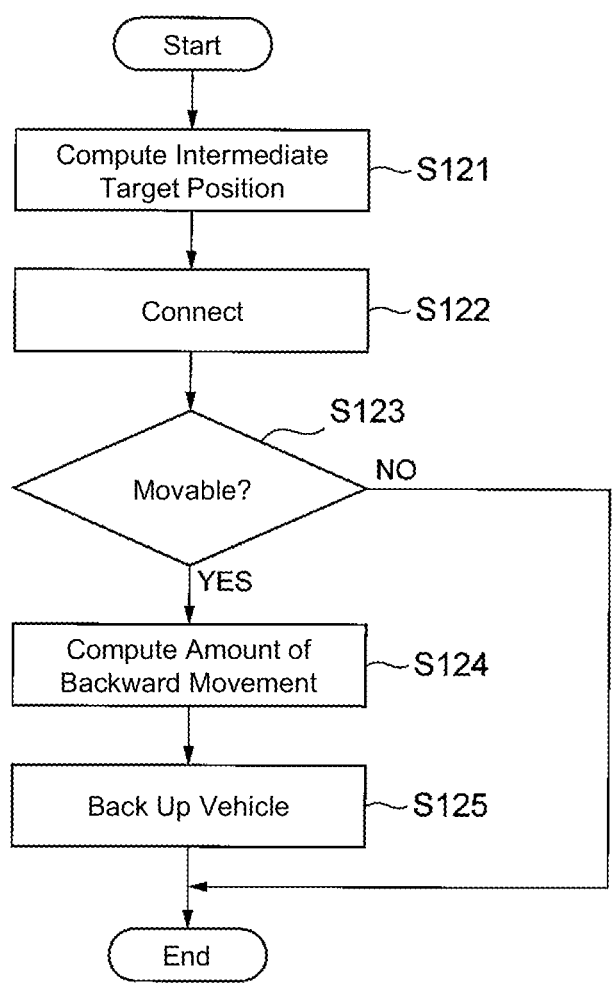
FIG. 20 is a flowchart illustrating a method of computing a second repositioning path.

FIG. 19 illustrate the operation of correcting a positional deviation along the second repositioning path. FIG. 20 is a flowchart illustrating a method of computing the second repositioning path.

The second repositioning path computing unit computes, as illustrated in FIG. 19(3), a pull-out path 40 for moving the vehicle V from its parked position to a position on the road 21 while turning the vehicle V to both the right and left sides, and as illustrated in FIG. 19(4), a pull-in path 41 for moving the vehicle V straight from the position on the road 21, to which the vehicle V has been moved along the pull-out path 40, into the parking space 20, and computes a second repositioning path by connecting the pull-out path 40 and the pull-in path 41.

The second repositioning path computing unit computes an intermediate target position P2 (S121), and computes an S-shaped path that connects the parked position of the vehicle V and the intermediate target position P2 (S122). Then, the second repositioning path computing unit determines whether the vehicle V can be moved along the S-shaped path (S123), and, if it is determined that the vehicle V can be moved along the S-shaped path, computes the amount of backward movement of the vehicle V in the direction to enter the parking space from the intermediate target position P2 (S124), and computes a path for backing up the vehicle V straight from the intermediate target position P2 by the computed amount of backward movement (S125).

In step S121, the intermediate target position P2 is set at a position away from the target parking position P1 along the parking orientation 26 of the parking space 20. The intermediate target position P2 is set on the basis of the road width W1 of the road 21, and when the road width W1 is wide, the intermediate target position P2 to be set is limited within a predetermined distance range from the parking space 20. The intermediate target position P2 is set at a position away from the obstacle 22 in front of the parking space 20 by a predetermined distance W2 as illustrated in FIG. 19(2), for example. The predetermined distance W2 is a length obtained by subtracting the rear overhang from the entire length of the vehicle V, and is set so that when the vehicle V is actually arranged, a gap with an error margin taken into consideration is formed between the vehicle V and the obstacle 22 as illustrated in FIG. 19(3).

In step S122, a pair of circles, which have identical radii and have a single point of tangency therebetween, between the parked position of the vehicle V and the intermediate target position P2, are computed, the one circle passing through the parked position of the vehicle V, and the other circle passing through the intermediate target position P2. Then, an S-shaped path is generated by combining an arc connecting the parked position and the single point of tangency along one of the circles, and an arc connecting the single point of tangency and the intermediate target position P2 along the other circle. To compute the S-shaped path, the method of generating an S-shaped path used for setting a reachable path with the aforementioned reachable path computing unit 13 (S116 in FIG. 8) can be used.

In step S123, the vehicle V is determined to be movable if both of the following two conditions are satisfied.

(1) The vehicle V does not contact the obstacle 23 or 24 when moved along the S-shaped path.

(2) Each of the radii of the pair of circles is greater than or equal to the minimum turning radius of the vehicle V.

If at least one of the aforementioned two conditions is not satisfied, the vehicle V is determined to be not movable and the second repositioning path cannot be set. Thus, the present routine terminates.

In step S124, the gap distance between the intermediate target position P2 and the target parking position P1 is computed as the amount of backward movement. In step S125, a path for backing up the vehicle V straight by the computed amount of backward movement is computed. When the vehicle V is backed up straight, generation of positional deviations can be suppressed more and the vehicle V can be arranged at a target parking position with higher accuracy than when the vehicle V is backed up while being turned.

The second repositioning path includes a path for moving the vehicle V from its parked position to the intermediate target position P2 through a S-turn steering maneuver (FIG. 19(3)), and a path for moving the vehicle V straight from the intermediate target position P2 to the target parking position P1 (FIG. 19(4)). Therefore, guiding the vehicle V along the second repositioning path can arrange the vehicle V in the parking space 20 without positional deviations.

Figure 21:
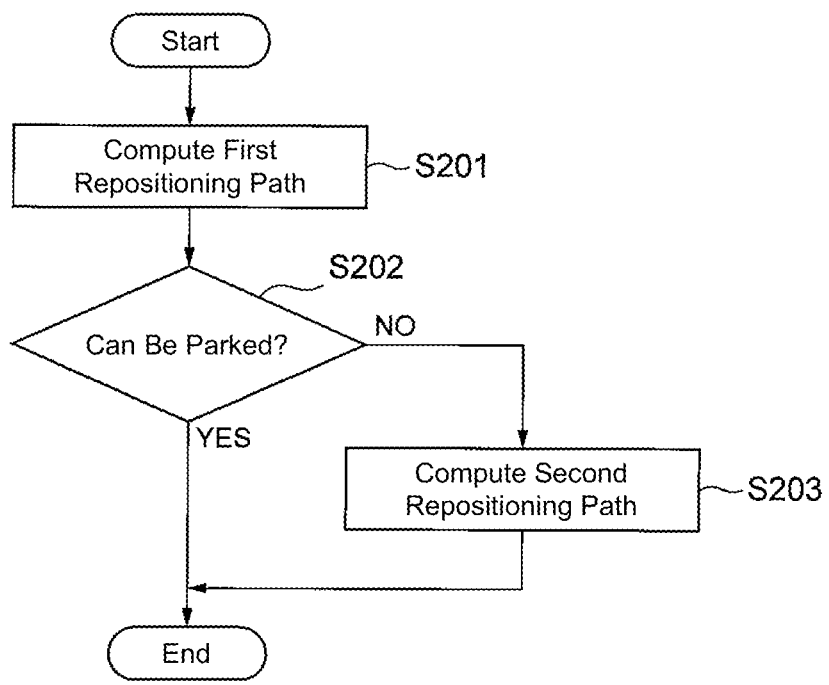
FIG. 21 is a flowchart illustrating a method of selecting a repositioning path.

FIG. 21 is a flowchart illustrating a method of selecting a repositioning path.

The repositioning path computing unit 16 first computes the first repositioning path using the first repositioning path computing unit (S201). Then, the repositioning path computing unit 16 determines whether the vehicle V can be repositioned along the computed first repositioning path (S202). If none of the aforementioned three parking prohibition conditions is satisfied, it is determined that the vehicle V can be repositioned along the first repositioning path (YES in S203). Then, a process of selecting the first repositioning path as a repositioning path is performed.

Meanwhile, if at least one of the three parking prohibition conditions is satisfied and it is thus determined that the vehicle V cannot be repositioned along the first repositioning path (NO in S203), the second repositioning path is computed by the second repositioning path computing unit (S203). Then, if none of the aforementioned two conditions is satisfied, it is determined that the vehicle V can be repositioned along the second repositioning path. Then, a process of selecting the second repositioning path as a repositioning path is performed.

According to the aforementioned selection method, if the vehicle V can be repositioned along both the first repositioning path and the second repositioning path, the first repositioning path is selected. Since the first repositioning path requires only a single-side steering maneuver, the amount of operation on the vehicle V as well as movement errors are smaller than when a path that requires an S-turn steering maneuver is used. Therefore, the time needed for the repositioning operation can be shortened, and thus, the vehicle V can be repositioned in a short time and the accuracy of parking can be increased.

The aforementioned parking assistance device 1 determines whether the vehicle V has any positional deviation in its parked position as a result of having been guided along the parking path, and if a positional deviation is determined to be present, computes a repositioning path for correcting the positional deviation. Then, the vehicle V can have a corrected positional deviation by being moved along the repositioning path, and the gap distance δ between the position Vo of the vehicle V and the target parking position P1 in the parking space 20 can be made less than a predetermined value, and also, the angle θ between the vehicle orientation Vf of the vehicle V and the parking orientation 26 of the parking space 20 can be made less than a predetermined value. The parking assistance device 1 can assist in reparking the vehicle V, which has been parked with its position and orientation deviated from ideal ones in or around the parking space 20, by repositioning the vehicle such that the vehicle V is at a correct position and in a correct orientation.

Although the embodiments of the present invention have been described in detail above, the present invention is not limited thereto, and various design changes can be made without departing from the spirit or scope of the present invention recited in the claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

1 Parking assistance device
11 Pull-out path computing unit
12 Candidate connection position setting unit
13 Reachable path computing unit
14 Parking path setting unit
15 Positional deviation determination unit
16 Repositioning path computing unit
17 Path display unit
20 Parking space
21 Road
22, 23, 24 Obstacle
25 Road orientation
26 Parking orientation
V Vehicle
Vo Reference point (position of vehicle)
P0 Initial position
P1 Target parking position
P2 Intermediate target position
D Candidate connection position
E Park-out position

The invention claimed is:

1. A parking assistance device for assisting in parking a vehicle in a parking space that is provided on one side of a road, comprising a processor configured with:
   a parking path setting function configured to set a parking path of from an initial position of the vehicle on the road to a target parking position in the parking space;
   a positional deviation determination function configured to, when the vehicle has been parked along the parking path, determine whether there is a positional deviation between the vehicle and the parking space; and
   a repositioning path computing function configured to, when a positional deviation is determined to be present, compute a repositioning path for correcting the positional deviation by moving the vehicle from the parking space to the road and then from the road to the target parking position in the parking space,
   wherein the positional deviation determination function is configured to determine that a positional deviation is present if at least one of the following two conditions is satisfied: a distance between a parked position of the vehicle and the target parking position in the parking space is greater than or equal to a predetermined value, or an angle between a vehicle orientation of the vehicle and a parking orientation of the parking space is greater than or equal to a predetermined value, and wherein the repositioning path computing function includes at least one of a first repositioning path computing function or a second repositioning path computing function, the first repositioning path computing function is configured to compute a pull-out path for moving the vehicle straight from the parked position of the vehicle to a position on the road, and a pull-in path for moving the vehicle from the position on the road into the parking space while turning the vehicle to one of a right or left side, and compute a first repositioning path by connecting the pull-out path and the pull-in path, and the second repositioning path computing function is configured to compute a pull-out path for moving the vehicle from the parked position of the vehicle to a position on the road while turning the vehicle to both right and left sides, and a pull-in path for moving the vehicle straight from the position on the road, to which the vehicle has been moved along the pull-out path, into the parking space, and compute a second repositioning path by connecting the pull-out path and the pull-in path.

2. The parking assistance device according to claim 1, wherein the first repositioning path computing function is configured to compute a circle having as tangents both the vehicle orientation of the vehicle and the parking orientation of the parking space, compute as the pull-out path a path obtained by connecting the parked position of the vehicle to a first point of tangency between the circle and the vehicle orientation of the vehicle, along the vehicle orientation of the vehicle using a straight line, and compute as the pull-in path each of a path obtained by connecting the first point of tangency to a second point of tangency between the circle and the parking orientation of the parking space, along the circle using an arc, and a path obtained by connecting the second point of tangency to the target parking position along the parking orientation of the parking space using a straight line.

3. The parking assistance device according to claim 2, wherein the first repositioning path computing function is configured to compute the first repositioning path when all of the following three computation conditions are satisfied: the second point of tangency is closer to a position outside of the parking space than to the target parking position, the vehicle does not contact an obstacle when moved along the circle, and the circle has a radius that is greater than or equal to a minimum turning radius of the vehicle.

4. The parking assistance device according to claim 1, wherein the second repositioning path computing function is configured to set an intermediate target position at a position on the road that is away from the target parking position along the parking orientation of the parking space on the basis of a road width of the road, compute a pair of circles having identical radii and having a single point of tangency therebetween, one of the circles passing through the parked position of the vehicle, the other circle passing through the intermediate target position, and computing as the pull-out each of a path obtained by connecting the target parking position to the single point of tangency along the one of the circles using an arc, and a path obtained by connecting the single point of tangency to the intermediate target position along the other circle using an arc, and compute as the pull-in path a path obtained by connecting the intermediate target position to the target parking position along the parking orientation using a straight line.

5. The parking assistance device according to claim 4, wherein the second repositioning path computing function is configured to compute the second repositioning path if both of the following two conditions are satisfied: the vehicle does not contact an obstacle when moved along the pair of circles, and each of the pair of circles has a radius that is greater than or equal to a minimum turning radius of the vehicle.

6. The parking assistance device according to claim 1, wherein the repositioning path computing function is configured to, when computation of the first repositioning path by the first repositioning path computing function is not available, compute the second repositioning path with the second repositioning path computing function.

\* \* \* \* \*